US012137324B2

(12) United States Patent
Pedersen et al.

(10) Patent No.: US 12,137,324 B2
(45) Date of Patent: Nov. 5, 2024

(54) BINAURAL HEARING AID SYSTEM AND A HEARING AID COMPRISING OWN VOICE ESTIMATION

(71) Applicant: Oticon A/S, Smørum (DK)

(72) Inventors: Michael Syskind Pedersen, Smørum (DK); Jan M. De Haan, Smørum (DK); Justyna Walaszek, Smørum (DK); Anders Vinther Olsen, Frederiksberg (DK); Karsten Bonke, Smørum (DK); Matias Tofteby Bach, Smørum (DK); Sigurdur Sigurdsson, Smørum (DK); Mojtaba Farmani, Smørum (DK); Andreas Thelander Bertelsen, Smørum (DK); Angela Josupeit, Smørum (DK); Claus Forup Corlin Jespersgaard, Smørum (DK); Gusztáv Lõcsei, Smørum (DK)

(73) Assignee: Oticon A/S, Smørum (DK)

( * ) Notice: Subject to any disclaimer, the term of this patent is extended or adjusted under 35 U.S.C. 154(b) by 0 days.

(21) Appl. No.: 18/379,411

(22) Filed: Oct. 12, 2023

(65) Prior Publication Data

US 2024/0048920 A1 Feb. 8, 2024

Related U.S. Application Data

(62) Division of application No. 17/512,125, filed on Oct. 27, 2021, now Pat. No. 11,825,270.

(30) Foreign Application Priority Data

Oct. 28, 2020 (EP) .................................... 20204405

(51) Int. Cl.
*H04R 25/00* (2006.01)

(52) U.S. Cl.
CPC ......... *H04R 25/505* (2013.01); *H04R 25/405* (2013.01); *H04R 25/407* (2013.01);
(Continued)

(58) Field of Classification Search
CPC ................ H04R 25/505; H04R 25/609; H04R 25/405; H04R 25/407; H04R 25/552; H04R 25/604; H04R 2225/43; H04R 2225/55
See application file for complete search history.

(56) References Cited

U.S. PATENT DOCUMENTS 8,768,478 B1 7/2014 James
10,524,063 B2 12/2019 Pedersen et al.
(Continued)

FOREIGN PATENT DOCUMENTS

EP 2 882 203 A1 6/2015
EP 3 051 844 A1 8/2016
(Continued)

OTHER PUBLICATIONS

Extended European Search Report for European Application No. 21205003.3, dated Jun. 30, 2022.
European Office Action for European Application No. 21 205 003.3, dated Jun. 17, 2024.

*Primary Examiner* — Mark Fischer
(74) *Attorney, Agent, or Firm* — Birch, Stewart, Kolasch & Birch, LLP

(57) ABSTRACT

A binaural hearing aid system includes first and second hearing aids configured to be worn by a user at or in respective first and second ears of the user, each of the first and second hearing aids including: at least one input transducer configured to pick up a sound at the at least one input transducer and to convert the sound to at least one electric input signal representative of the sound, the sound at the at least one input transducer including a mixture of a target signal and noise; a controller for evaluating the sound at the at least one input transducer and providing a control signal indicative of a property of the sound; a transceiver configured to establish a communication link between the first and second hearing aids allowing the exchange of the control signal between the first and second hearing aids; a transmitter for establishing an audio link for transmitting the at least one electric input signal, or a processed version thereof, to another device. The controller is configured to: transmit
(Continued)

the locally provided control signal to, and receive a corresponding remotely provided control signal from the opposite hearing aid via the communication link, and to compare the locally provided and the remotely provided control signals and to provide a comparison control signal in dependence thereof, and to transmit the at least one electric input signal, or a processed version thereof, to the another device via the audio link in dependence of the comparison control signal.

17 Claims, 10 Drawing Sheets

(52) U.S. Cl.
CPC ......... *H04R 25/552* (2013.01); *H04R 25/604* (2013.01); *H04R 25/609* (2019.05); *H04R 2225/43* (2013.01); *H04R 2225/55* (2013.01)

(56) References Cited

U.S. PATENT DOCUMENTS

| | | | | |
|---|---|---|---|---|
| 2011/0125218 | A1 | 5/2011 | Busby | |
| 2014/0321682 | A1 * | 10/2014 | Kofod-Hansen ...... | H04R 25/30 381/315 |
| 2015/0163602 | A1 | 6/2015 | Pedersen et al. | |
| 2017/0127172 | A1 | 5/2017 | Dusan et al. | |
| 2019/0208334 | A1 * | 7/2019 | Petersen ............. | H04R 25/505 |

FOREIGN PATENT DOCUMENTS

| | | | |
|---|---|---|---|
| EP | 3 267 698 | A1 | 1/2018 |
| EP | 3 637 800 | A1 | 4/2020 |
| EP | 3 726 856 | A1 | 10/2020 |
| WO | WO 2020/018568 | A1 | 1/2020 |

* cited by examiner

BINAURAL HEARING AID SYSTEM AND A HEARING AID COMPRISING OWN VOICE ESTIMATION

This application is a Divisional of co-pending U.S. patent application Ser. No. 17/512,125, filed on Oct. 27, 2021, which claims priority under 35 U.S.C. § 119(a) to Application No. 20204405.3, filed in Europe, on Oct. 28, 2020, all of which are hereby expressly incorporated by reference into the present application.

SUMMARY

A Binaural Hearing Aid System

In an aspect of the present application, a binaural hearing aid system comprising first and second hearing aids configured to be worn by a user at or in respective first and second ears of the user is provided. Each of the first and second hearing aids comprises

- at least one input transducer configured to pick up a sound at said at least one input transducer and to convert the sound to at least one electric input signal representative of said sound, the sound at said at least one input transducer comprising a mixture of a target signal and noise,
- a controller for evaluating said sound at said at least one input transducer and providing a control signal indicative of a property of said sound,
- a transceiver configured to establish a communication link between the first and second hearing aids allowing the exchange of said control signal between the first and second hearing aids,
- a transmitter for establishing an audio link for transmitting said at least one electric input signal, or a processed version thereof, to another device.

The controller may be configured to

- transmit said locally provided control signal to, and
- receive a corresponding remotely provided control signal from the opposite hearing aid via said communication link, and to
- compare said locally provided and said remotely provided control signals and to provide a comparison control signal in dependence thereof, and to
- a transmit said at least one electric input signal, or a processed version thereof, to said another device via said audio link in dependence of said comparison control signal.

Thereby an improved hearing aid may be provided.

The at least one input transducer may comprise at least one microphone.

The a least one input transducer may comprise at least two input transducers providing at least two electric input signals. The at least two input transducers may comprise at least two microphones.

The first and second hearing aids may comprise a beamformer filter connected to the at least two input transducers.

The beamformer filter may comprise an own voice beamformer configured to provide an estimate of the user's own voice based on the at least two electric input signals. The own voice beamformer may be implemented as a linear combination of the at least two electric input signals (IN1, IN2, . . . , INM, where M is the number of input transducers). The estimate (OVE) of the user's own voice may thus be expressed as OVE=w1·IN1+w2·IN2+wM·INM, where wm (in the frequency domain) is a (complex-valued) weight vector (wm(k)=(wm(1), wm(2), . . . , wm(K)), where K is the number of frequency bands), the weights being either fixed, or adaptively updated, e.g. to adapt to a changing noise environment.

The property of the sound comprises a signal-to-noise ratio. The first and second hearing aids may comprise an estimator of a quality parameter (e.g. a signal to noise ratio) the at least one electric input signal of a processed version thereof. The controller may be configured to decide whether or not to transmit the at least one electric input signal, or a processed version thereof, of a given one of the first and second hearing aids to the 'another device' based on the comparison control signal. The controller may be configured to transmit the at least one electric input signal, or a processed version thereof, from the hearing aid exhibiting the highest signal-to-noise to the 'another device', e.g. a telephone.

The property of the sound may comprise a noise level estimate, or a level estimate of the at least one electric input signal. The first and second hearing aids may comprise an estimator of a current noise level at the first and second hearing aid, respectively. In an embodiment, the noise level is estimated in absence of detected own voice. The controller may be configured to transmit the at least one electric input signal, or a processed version thereof, from the hearing aid exhibiting the lowest noise estimate, or the lowest level estimate of the at least one electric input signal, or a processed version thereof. The noise may comprise or be constituted by wind noise. The property of the sound may comprise a wind noise estimate. The first and second hearing aids may each comprise an estimator of wind noise. Wind noise is generally less likely to occur simultaneously (or at similar levels) at both ears. The controller may be configured to transmit the at least one electric input signal, or a processed version thereof, from the hearing aid exhibiting the lowest wind noise.

The level estimates may be found in short time-frequency units, which e.g. are updated every millisecond or every second millisecond.

The level estimate may be based on a mixture of some or all the available microphone signals or processed versions thereof.

As the lowest noise level for different time-frequency units may be found for different microphone or different combinations of microphones, the resulting signal becomes a mixture of all microphone signals or processed versions thereof. This would however require that the binaural signal is available at the hearing aid which transmits the audio signal to the external device.

Alternatively, only level estimates are exchanged between the hearing aids in order to create a (binary) gain mask which is selecting the time-frequency units with least enemy after a binaural level comparison.

The controller may be configured to create a (binary) gain mask based on level estimates at the first and second hearing aids.

The controller may be configured to create a (binary) gain mask (binary gain pattern') based on said comparison control signal.

The controller may be configured to transmit said at least one electric input signal, or a processed version thereof, to said another device via said audio link in dependence of said comparison control signal and/or said (binary) gain mask.

The controller may be configured to transmit said at least one electric input signal, or a processed version thereof, to said opposite hearing aid in dependence of said comparison control signal and/or said (binary) gain mask.

The hearing aid may be configured to attenuate or keep or enhance said at least one electric input signal, or a processed version thereof, in dependence of said comparison control signal and/or said (binary) gain mask (binary gain pattern).

The property of, the sound may comprise a speech intelligibility estimate. The first and second hearing aids may each comprise a speech intelligibility estimator. The controller may be configured to transmit the at least one electric input signal, or a processed version thereof, from the hearing aid exhibiting the highest speech intelligibility measure.

The property of the sound may comprise a feedback estimate. The first and second hearing aids may each comprise an estimator of feedback from an output transducer to an input transducer of the hearing aid in question. The controller may be configured to transmit the at least one electric input signal, or a processed version thereof, from the hearing aid exhibiting the lowest feedback estimate.

The beamformer filter may further comprise an environment beamformer configured to provide an estimate of a target signal in the (far-field) environment (of the user).

The binaural hearing aid system (e.g. each of the first and second hearing aids) may be configured to operate in at least two modes, a normal mode, wherein the estimate of the target signal in the environment has first priority and an own voice mode, wherein the estimate of the user's own voice has first priority. The binaural hearing aid system may be configured to prioritize the processing power in dependence of the two modes of operation. The binaural hearing aid system may be configured to apply adaptive noise reduction (and/or post processing, processing based on neural networks) in the own voice beamformer when the binaural hearing aid system is in the own voice mode. The binaural hearing aid system may, on the other hand, be configured to apply fixed beamforming in the environment beamformer, when the binaural hearing aid system is in the own voice mode.

Likewise, the binaural hearing aid system may be configured to apply adaptive noise reduction (and/or post processing, processing based on neural networks) in the environment beamformer when the binaural hearing aid system is in the normal mode. The binaural hearing aid system may, on the other hand, be configured to apply fixed beamforming in the own voice beamformer, when the binaural hearing aid system is in the normal mode. If the hearing instrument is in normal mode, the majority of the processing is aimed at enhancement of the surroundings while less (or no) processing power is applied in order to pick up the own voice signal (e.g. to be used as pre-processing for keyword detection). Contrary if the hearing instrument is in own voice mode (e.g. a telephone mode), it is proposed to change the processing such that the majority of the processing power available for noise reduction is applied to the own voice signal and less processing is applied to the local sound presented to the hearing aid wearer, cf FIG. 9A, 9B. In other modes too, where the main signal of interest is not received by the hearing aid microphones, change of processing focus may be applied, e.g. during TV streaming, Bluetooth streaming, FM or telecoil streaming, etc.

The first and second hearing aids of the binaural hearing aid system may be constituted by or comprise an air-conduction type hearing aid, a bone-conduction type hearing aid, a cochlear implant type hearing aid, or a combination thereof.

A Hearing Aid

A hearing aid configured to be worn by a user at or in an ear of the user is provided by the present disclosure. The hearing aid comprises

- at least one input transducer configured to pick up a sound at said at least one input transducer and to convert the sound to at least one electric input signal representative of said sound, the sound at said at least one input transducer comprising a mixture of a target signal and noise,
- a controller for evaluating said sound at said at least one input transducer and providing a control signal indicative of a property of said sound,
- a transceiver configured to establish a communication link to a contra-lateral hearing aid of a binaural hearing aid system allowing the exchange of said control signal between the two hearing aids,
- a transmitter for establishing an audio link for transmitting said at least one electric input signal, or a processed version thereof, to another device,
- wherein said controller is configured to
  - transmit said locally provided control signal to, and
  - receive a corresponding remotely provided control signal from said contra-lateral hearing aid via said communication link, and to
  - compare said locally provided and said remotely provided control signals and to provide a comparison control signal in dependence thereof, and to
  - transmit said at least one electric input signal, or a processed version thereof, to said another device via said audio link in dependence of said comparison control signal.

The hearing aid may be used as a first and/or second hearing aid, respectively, of the binaural hearing aid system according to the present disclosure. Each of the first and second hearing aids of the binaural hearing aid system may be implemented as the hearing aid described above and hereafter.

The controller may be configured to evaluate the audio link for transmitting said at least one electric input signal, or a processed version thereof, to another device.

The controller may be configured to provide a control signal indicative of a quality of the audio link between the hearing aid and the other device (e.g. a mobile phone).

The quality of the audio link may depend on the distance between the hearing aid and the other device.

For example, when the distance between a first hearing aid and the other device is shorter than the distance between a second hearing aid and the other device, the quality of the audio link between the first hearing aid and the other device will most likely be better than between the second hearing aid and the other device.

The controller may be configured to
- transmit said locally provided control signal to, and
- receive a corresponding remotely provided control signal from an opposite hearing aid via said communication link, and to
- compare said locally provided and said remotely provided control signals and to provide a comparison control signal in dependence thereof, and to
- transmit said at least one electric input signal, or a processed version thereof, to said another device via said audio link in dependence of said comparison control signal.

The controller may be configured to transmit and/or receive the at least one electric input signal to/from a contra-lateral hearing aid.

The controller may be configured to transmit the at least one electric input signal to a contra-lateral hearing aid in dependence of said comparison control signal.

For example, a binaural hearing system with first and second hearing aids and another device, e.g. a mobile phone, may be considering. An audio link (e.g. a wireless connection) may exist between each of the two hearing aids and the mobile phone. The quality of the audio link may be better at one ear than the other. In such a case, it may be advantageous to transmit the at least one electric input signal from the hearing aid which has the better audio link.

In another example of a binaural hearing system and a mobile phone, the controller may determine the hearing aid which receives the voice of the user best based on evaluating the sound at each of the input transducers. However, it may be the case that the controller determines that the hearing aid receiving the voice of the user best is not identical to the hearing aid having the best audio link to the mobile phone, Thereby, it may be required that the electric input signal has to be transmitted via the communication link (e.g. via a magnetic link) from the hearing aid receiving the voice of the user best to the hearing aid having the best audio link, before being transmitted to the mobile phone.

The hearing aid may comprise a battery for powering the hearing aid.

The controller may be configured to evaluate the battery of the hearing aid.

The controller may be configured to provide a control signal indicative of battery power availability of the battery.

The battery power availability may comprise one or more of a current battery power consumption and/or a remaining battery lifetime and/or a maximum power consumption, etc., e.g. based on a battery indicator or a battery usage indicator.

The controller may be configured to transmit said locally provided control signal to, and receive a corresponding remotely provided control signal from an opposite hearing aid via said communication link, and to compare said locally provided and said remotely provided control signals and to provide a comparison control signal in dependence thereof, and to transmit said at least one electric input signal, or a processed version thereof, to said another device via said audio link in dependence of said comparison control signal.

The controller may be configured to transmit and/or receive the at least one electric input signal to/from a contra-lateral hearing aid.

The controller may be configured to transmit said at least one electric input signal, or a processed version thereof, to said another device via said audio link in dependence of said comparison control signal.

For example, when considering a binaural hearing system with first and second hearing aids, the controller of the first hearing aid may transmit the electric input signal, or a processed version thereof, to a mobile phone during a first phone call, and the controller of the second hearing aid may transmit the electric input signal, or a processed version thereof, to the mobile phone during a following second phone call. Thereby, power consumption during phone calls are distributed between the first and second hearing aids.

For example, when considering a binaural hearing system with first and second hearing aids, the controller of the first or second hearing aid may transmit the electric input signal, or a processed version thereof, to a mobile phone (e.g. during a first phone call) depending on the remaining battery lifetime of the first or second hearing aid. Thereby, the hearing aid having the battery with the longest remaining battery lifetime may be used for transmitting the electric input signal.

For example, when considering a binaural hearing system with first and second hearing aids, the controller of the first or second hearing aid may transmit the electric input signal, or a processed version thereof, to a mobile phone depending on the current battery power consumption of the first and second hearing aids. For example, the hearing aid user may have a much larger hearing loss on one ear than on the other, which may result in a larger battery power consumption for the hearing aid used on the ear with the larger hearing loss. Thereby, the hearing aid providing the least gain may be used for transmitting the electric input signal.

For example, when considering a binaural hearing system with first and second hearing aids, the controller of the first or second hearing aid may transmit the electric input signal, or a processed version thereof, to a mobile phone depending on the maximum power consumption. Thereby, in case e.g. the first hearing aid would risk moving near or above the maximum power consumption of the battery, the controller of the second hearing aid should transmit the electric input signal.

The control signal may be indicative of a property of said sound at said at least one input transducer, and/or a quality of the audio link between the hearing aid and the other device, and/or a battery power availability of the battery of the hearing aid.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may comprise a number of electrodes of a cochlear implant (for a C1 type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid).

The hearing aid may comprise an input unit for providing at least one electric input signal representing sound. The input unit may comprise the input transducer, e.g. a microphone, for converting an input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing aid may comprise a directional microphone system connected to the at least one electric input signal and adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the at least one electric input signal(s) originates. The directional system may be adapted to attenuate (such as adaptively attenuate) noise in the environment around the user. This can be achieved in various different ways as e.g. described in the prior art. In hearing aids, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals ('noise') from other directions maximally. The generalized sidelobe canceller (GSC) structure is an equivalent representation of the MVDR beamformer offering computational and numerical advantages over a direct implementation in its original form.

The hearing aid may comprise antenna and transceiver circuitry (e.g. a wireless receiver) for wirelessly receiving a direct electric input signal from another device, e.g. from an entertainment device (e.g. a TV-set), a communication device (e.g. a telephone), a wireless microphone, or another hearing aid. The direct electric input signal may represent or comprise an audio signal and/or a control signal and/or an information signal. The hearing aid may comprise demodulation circuitry for demodulating the received direct electric input to provide the direct electric input signal representing an audio signal and/or a control signal e.g. for setting an operational parameter (e.g. volume) and/or a processing parameter of the hearing aid. In general, a wireless link established by antenna and transceiver circuitry of the hearing aid can be of any type (including be uni-directional or bi-directional). The wireless link may be established between two devices, e.g. between an entertainment device (e.g. a TV) and the hearing aid, or between two hearing aids, e.g. via a third, intermediate device (e.g. a processing device, such as a remote control device, a smartphone, etc.). The wireless link may be used under power constraints, e.g. in that the hearing aid may be constituted by or comprise a portable (typically battery driven) device. The wireless link may be a link based on near-field communication, e.g. an inductive link based on an inductive coupling between antenna coils of transmitter and receiver parts. The wireless link may be based on far-field, electromagnetic radiation. The communication via the wireless link may be arranged according to a specific modulation scheme, e.g. an analogue modulation scheme, such as FM (frequency modulation) or AM (amplitude modulation) or PM (phase modulation), or a digital modulation scheme, such as ASK (amplitude shift keying), e.g. On-Off keying, FSK (frequency shift keying), PSK (phase shift keying), e.g. MSK (minimum shift keying), or QAM (quadrature amplitude modulation), etc.

The communication between the hearing aid and the other device may be based on some sort of modulation at frequencies above 100 kHz. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology).

The communication link between the first and second hearing aids may be based on an inductive link as described above.

The audio link for transmitting said at least one electric input signal, or a processed version thereof, to another device may be based on Bluetooth technology (e.g. Bluetooth Low-Energy technology The hearing aid may comprise a forward or signal path between an input unit (e.g. an input transducer, such as a microphone or a microphone system and/or direct electric input (e.g. a wireless receiver)) and an output unit, e.g. an output transducer. The signal processor may be located in the forward path. The signal processor may be adapted to provide a frequency dependent gain according to a user's particular needs. The hearing aid may comprise an analysis path comprising functional components for analyzing the input signal (e.g. determining a level, a modulation, a type of signal, an acoustic feedback estimate, etc.). Some or all signal processing of the analysis path and/or the signal path may be conducted in the frequency domain. Some or all signal processing of the analysis path and/or the signal path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate, e.g. 20 kHz. The hearing aids may comprise a digital-to-analogue (DA) converter to convert a digital signal to an analogue output signal, e.g. for being presented to a user via an output transducer.

The hearing aid, e.g. the input unit, and or the antenna and transceiver circuitry comprise(s) a TF-conversion unit for providing a time-frequency representation of an input signal. The time-frequency representation may comprise an array or map of corresponding complex or real values of the signal in question in a particular time and frequency range. The IF conversion unit may comprise a filter bank for filtering a (time varying) input signal and providing a number of (time varying) output signals each comprising a distinct frequency range of the input signal. The IF conversion unit may comprise a Fourier transformation unit for converting a time variant input signal to a (time variant) signal in the (time-) frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2 f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing aid is reduced (e.g. to save power), e.g. to disable wireless communication, and/or to disable specific features of the hearing aid. A mode of operation may include a telephone mode, where a handsfree communication between the hearing aid and the user's telephone is facilitated. Another mode of operation may be a voice control mode, where a user's control of functionality of the hearing aid (or another device) via spoken commands is enabled.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);
b) the current acoustic situation (input level, feedback, etc.), and
c) the current mode or state of the user (movement, temperature, cognitive load, etc.);
d) the current mode or state of the hearing aid (program selected, time elapsed since last user interaction, etc.) and/or of another device in communication with the hearing aid.

The classification unit may be based on or comprise a neural network, e.g. a rained neural network.

The hearing aid may comprise an acoustic (and/or mechanical) feedback control (e.g. suppression) or echo-cancelling system. The hearing aid may further comprise other relevant functionality for the application in question, e.g. compression, noise reduction, etc.

The hearing aid may comprise a hearing instrument, e.g. a hearing instrument adapted for being located at the ear or fully or partially in the ear canal of a user, e.g. a headset, an earphone, an ear protection device or a combination thereof.

Use

In an aspect, use of a hearing aid as described above, in the 'detailed description of embodiments' and in the claims, is moreover provided. Use may be provided in a system comprising one or more hearing aids (e.g. hearing instruments), headsets, ear phones, active ear protection systems, etc., e.g. in handsfree telephone systems, teleconferencing systems, etc.

A Method

In an aspect a method of operating a hearing aid configured to be worn at or in an ear of a user is provided by the present disclosure. The method comprises

- converting sound to at least one electric input signal representative of said sound, the sound at said at least one input transducer comprising a mixture of a target signal and noise;
- evaluating said sound at said at least one input transducer and providing a control signal indicative of a property of said sound;
- establishing a communication link to a contra-lateral hearing aid of a binaural hearing aid system allowing the exchange of said control signal between the two hearing aids;

establishing an audio link for transmitting said at least one electric input signal, or a processed version thereof, to another device;

transmitting said locally provide control signal to, and receiving a corresponding remotely provided control signal from said contra-lateral hearing aid via said communication link, and comparing said locally provided and said remotely provided control signals and providing a comparison control signal in dependence thereof, and transmitting said at least one electric input signal, or a processed version thereof, to said another device via said audio link in dependence of said comparison control signal.

It is intended that some or all of the structural features of the system described above, in the 'detailed description of embodiments' or in the claims can be combined with embodiments of the method, when appropriately substituted by a corresponding process and vice versa. Embodiments of the method have the same advantages as the corresponding systems.

A Hearing System

In a further aspect, a hearing system comprising a hearing aid as described above, in the 'detailed description of embodiments', and in the claims, AND an auxiliary device is moreover provided.

The hearing system may be adapted to establish a communication link between the hearing aid and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone, (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

An APP

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with said hearing aid or said hearing system.

A Further Hearing Aid

In a further aspect, a hearing aid configured to be worn by a user at or in an ear of the user is provided by the present disclosure. The hearing aid comprises at least two input transducers configured to pick up a sound at said at least two input transducers and to convert the sound to respective at least two electric input signals representative of said sound, a first filter for filtering said at least two electric input signals and providing a first filtered signal, an output transducer for converting said first filtered signal, or a signal derived therefrom, to stimuli perceivable by the user as sound, second filter for filtering said at least two electric input signals and providing a second filtered signal comprising a current estimate of the user's own voice, a transceiver for establishing an audio link to an external communication device (e.g. a telephone), a controller configured to allow the hearing aid to operate in at least two modes, a communication mode wherein said audio link to said external communication device is established, and at least one non-communication mode, wherein each of the first and second filters are configured to operate in a more power consuming and a less power consuming mode in dependence of said controller, and wherein said controller, when said hearing aid is in said communication mode, is configured to set said first filter in said less power consuming mode, and set said second filter in said more power consuming mode.

The controller may additionally or alternatively be configured to set the first filter in the more power consuming mode, and set the second filter in the less power consuming mode, when the hearing aid is in the non-communication mode.

The controller may provide a mode control signal indicative of an intended present mode of operation.

When a (first or second) filter is in the 'more power consuming mode' it consumes more power than when in the 'less power consuming mode' (e.g. more than twice as much).

The first and second filters may each comprise a beamformer filter for providing a spatially filtered (beamformed) signal based on the at least two electric input signals (e.g. as a linear combination thereof in dependence of generally complex beamformer weights). The beamformer filter may be adaptive in that noise is adaptively attenuated (beamformer weights are adaptively determined). The beamformer filter may be adaptive in a direction to a target signal is adaptively estimated (beamformer weights are adaptively determined). The beamformer filter may be fixed (beamformer weights are pre-determined).

The first and second filters may each comprise a post filter for filtering the spatially filtered (beamformed) signal and provide a further noise reduced signal.

When the first or second filter is in the more power consuming mode, beamformer weights of the beamformer filter are adaptively determined (continuously updated). When the first or second filter is in the more power consuming mode, a post filter may be activated.

When the first or second filter is in the less power consuming mode, beamformer weights of the beamformer filter are pre-determined (not continuously updated). When the first or second filter is in the less power consuming mode, a post filter may be deactivated.

Definitions

In the present context, a hearing aid, e.g. a hearing instrument, refers to a device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing aid may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing aid may comprise a single unit or several units communicating (e.g. acoustically, electrically or optically) with each other. The loudspeaker may be arranged in a housing together with other components of the hearing aid, or may be an external unit in itself (possibly in combination with a flexible guiding element, e.g. a dome-like element).

More generally, a hearing aid comprises an input transducer for receiving an acoustic signal from a user's surroundings and providing a corresponding input audio signal and/or a receiver for electronically (i.e. wired or wirelessly) receiving an input audio signal, a (typically configurable) signal processing circuit (e.g. a signal processor, e.g. comprising a configurable (programmable) processor, e.g. a digital signal processor) for processing the input audio signal and an output unit for providing an audible signal to the user in dependence on the processed audio signal. The signal processor may be adapted to process the input signal in the time domain or in a number of frequency bands. In some hearing aids, an amplifier and/or compressor may constitute the signal processing circuit. The signal processing circuit typically comprises one or more (integrated or separate) memory elements for executing programs and/or for storing parameters used (or potentially used) in the processing and/or for storing information relevant for the function of the hearing aid and/or for storing information (e.g. processed information, e.g. provided by the signal processing circuit), e.g. for use in connection with an interface to a user and/or an interface to a programming device. In some hearing aids, the output unit may comprise an output transducer, such as e.g. a loudspeaker for providing an air-borne acoustic signal or a vibrator for providing a structure-borne or liquid-borne acoustic signal. In some hearing aids, the output unit may comprise one or more output electrodes for providing electric signals (e.g. to a multi-electrode array) for electrically stimulating the cochlear nerve (cochlear implant type hearing aid).

In some hearing aids, the vibrator may be adapted to provide a structure-borne acoustic signal transcutaneously or percutaneously to the skull bone. In some hearing aids, the vibrator may be implanted in the middle ear and/or in the inner ear. In some hearing aids, the vibrator may be adapted to provide a structure-home acoustic signal to a middle-ear bone and/or to the cochlea. In some hearing aids, the vibrator may be adapted to provide a liquid-borne acoustic signal to the cochlear liquid, e.g. through the oval window. In some hearing aids, the output electrodes may be implanted in the cochlea or on the inside of the skull bone and may be adapted to provide the electric signals to the hair cells of the cochlea, to one or more hearing nerves, to the auditory brainstem, to the auditory midbrain, to the auditory cortex and/or to other parts of the cerebral cortex.

A hearing aid may be adapted to a particular user's needs, e.g. a hearing impairment. A configurable signal processing circuit of the hearing aid may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing aid via an interface to a programming device (fitting system) and used by a processing algorithm executed by the configurable signal processing circuit of the hearing aid.

A 'hearing system' refers to a system comprising one or two hearing aids, and a 'binaural hearing system' refers to a system comprising two hearing aids and being adapted to cooperatively provide audible signals to both of the user's ears. Hearing systems or binaural hearing systems may further comprise one or more 'auxiliary devices', which communicate with the hearing aid(s) and affect and/or benefit from the function of the hearing aid(s). Such auxiliary devices may include at least one of a remote control, a remote microphone, an audio gateway device, an entertainment device, e.g. a music player, a wireless communication device, e.g. a mobile phone (such as a smartphone) or a tablet or another device, e.g. comprising a graphical interface., Hearing aids, hearing systems or binaural hearing systems may e.g. be used for compensating for a hearing-impaired person's loss of hearing capability, augmenting or protecting a normal-hearing person's hearing capability and/or conveying electronic audio signals to a person. Hearing aids or hearing systems may e.g. form part of or interact with public-address systems, active ear protection systems, handsfree telephone systems, car audio systems, entertainment (e.g. TV, music playing or karaoke) systems, teleconferencing systems, classroom amplification systems, etc. Embodiments of the disclosure may e.g. be useful in applications such as handsfree telephony, keyword detection, voice control, etc.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing aids. The disclosure relates in particular to own voice estimation, e.g. in noisy environments.

Figure 1:
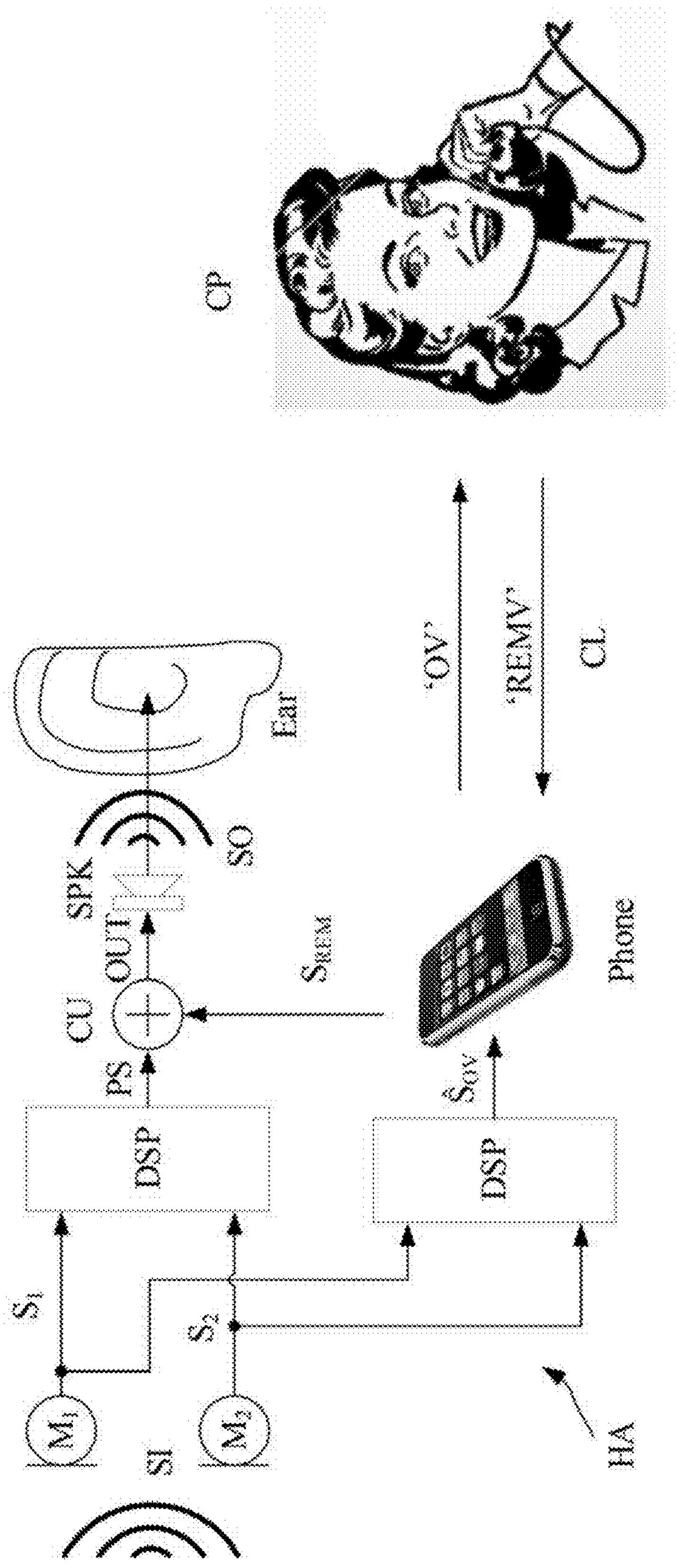
FIG. 1 shows a hearing aid according to the present disclosure in a setup configured for facilitating a telephone conversation.

FIG. 1 shows a hearing aid according to the present disclosure in a setup configured for facilitating a telephone conversation. The hearing aid user is presented to a mixture (SO) of local sound (SI) as well as the voice (REMV) of a far-end talker (CP), while the far-end listener (CP) is presented to the audio obtained from the hearing aid microphones (M1, M2). Possibly the hearing aid microphone signals (IN1, IN2) are enhanced (DSP) in order to present the voice (UV) of the hearing aid user, where the noisy background sounds (SI) have been reduced.

Figure 2:
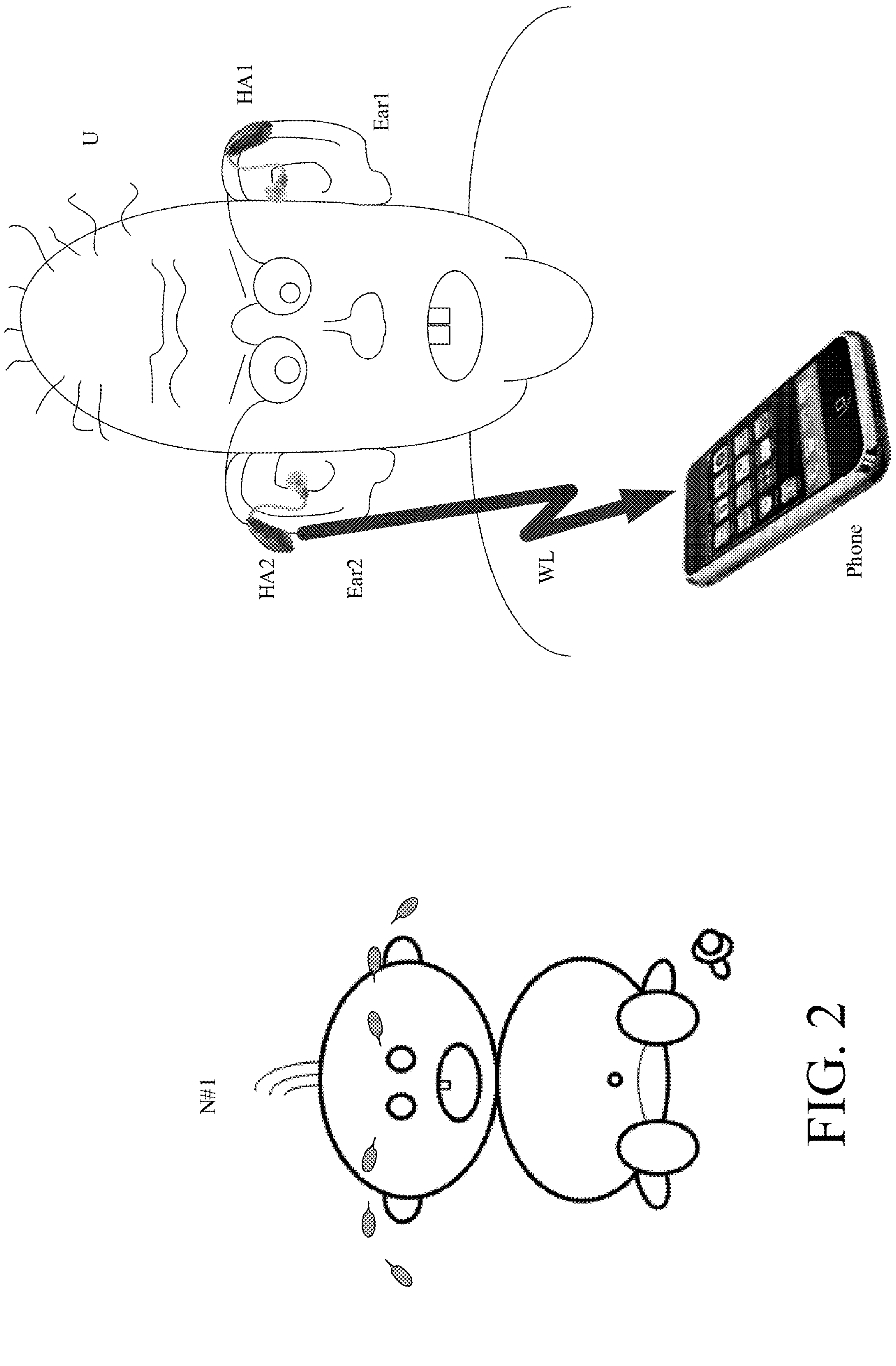
FIG. 2 illustrates a hearing aid user wearing a binaural hearing aid system according to the present disclosure in a first mode of a telephone conversation conducted in asymmetrically distributed background noise.

FIG. 2 shows a hearing aid user wearing a binaural hearing aid system according to the present disclosure in a first mode of a telephone conversation conducted in asymmetrically distributed background noise. A hearing instrument (hearing aid, headset, hearable) is being used for phone conversation such that the voice (OV) of the hearing instrument wearer (U) is picked up by the hearing instrument and the sound is possibly enhanced and transmitted to the far-end listener via a telephone (Phone). This is illustrated in FIG. 1. The audio signal (REMV) from the far-end talker (CP) is streamed directly from the phone via the hearing instrument (HA1, HA2) into the ear canal of the person (U) wearing the hearing instrument. In order to keep a phone conversation running, it is important that both talkers are intelligible. In order to enhance the signal transmitted to the far-end listener, background noise can be suppressed e.g. by use of an own voice beamformer, aiming at reducing the noise as much as possible while the own voice is unaltered. The own voice may be further enhanced by an own voice filter. Typically, signal enhancement is applied locally at one of the hearing instruments, which then transmits the enhanced signal to the telephone. In some situations, as illustrated in FIG. 2, one hearing instrument (HA2) is exposed to more background noise than the other hearing instrument (HA1) (here due to noise source Ng#1, e.g. a baby crying). In this situation it would be better to transmit the enhanced audio signal of the instrument (HA1) which (e.g. due to the head shadowing effect) is exposed to a smaller amount of background noise. This is illustrated in FIG. 3.

Figure 3:
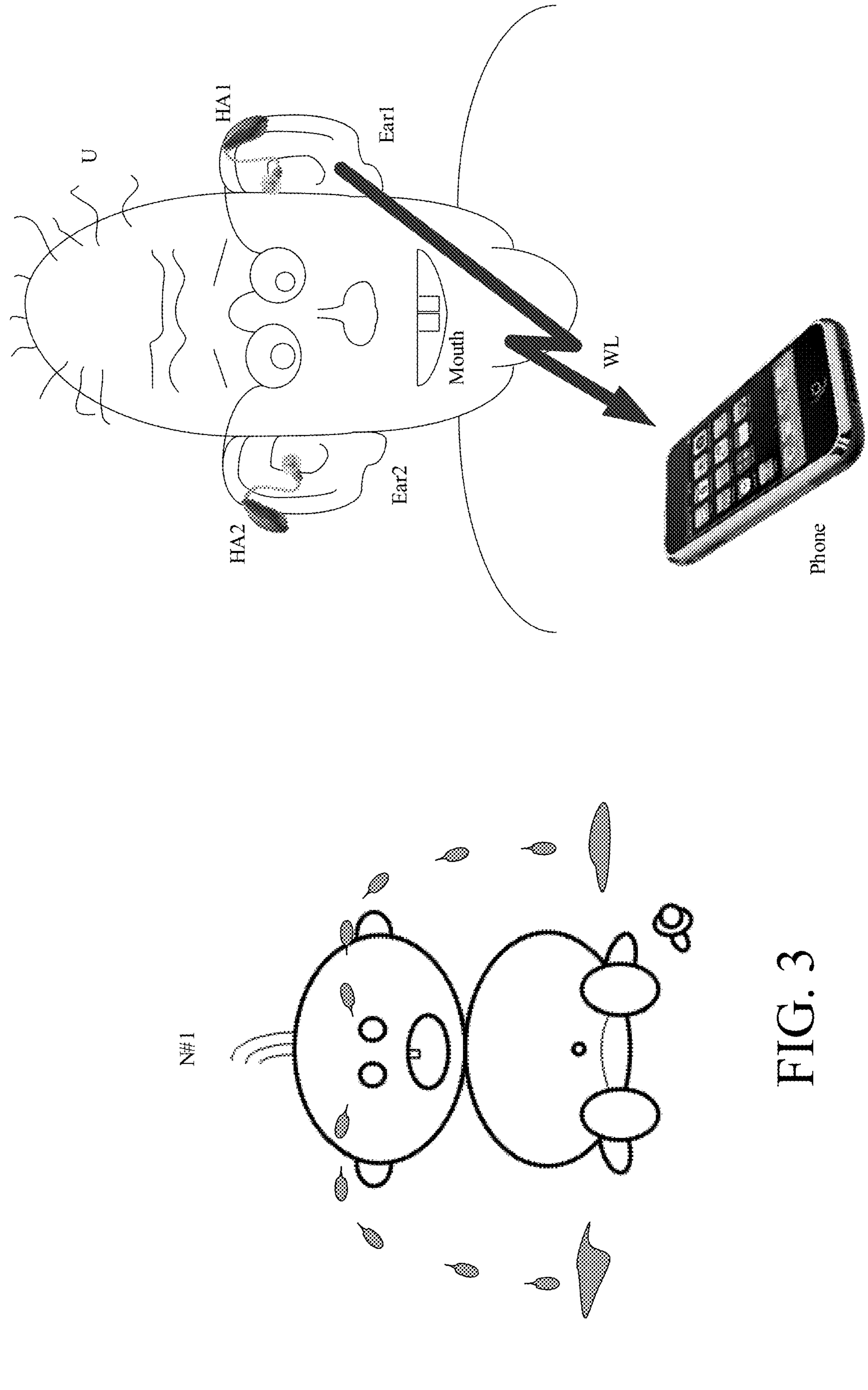
FIG. 3 illustrates a hearing aid user wearing a binaural hearing aid system according to the present disclosure in a second mode of a telephone conversation conducted asymmetrically distributed background noise.

FIG. 3 shows illustrates a hearing aid user wearing a binaural hearing aid system according to the present disclosure in a second mode of a telephone conversation conducted in asymmetrically distributed background noise. The second mode of a telephone conversation is similar to the first mode illustrated in FIG. 2 apart from the user's voice (UV) being picked up at the opposite ear (Ear1) in the second mode compared to first mode (Ear2), B transmitting the (possibly enhanced) audio signal (OV) from the hearing instrument (HA1) exposed to the smallest amount of background noise, a more intelligible signal can be presented to the far-end talker.

By having access to two hearing instruments (HA1, HA2), it is possible to obtain an even better estimate of the hearing instrument user's own voice (OV). In order to achieve the full potential of the two hearing instruments, it would be advantageous to combine the microphone signals from the two instruments. This would either require that the microphone signal from one instrument is transmitted to the other (oppositely located) instrument, which then transmits a (possibly) linear combination of the microphone signals to the far end talker via the telephone. Transmitting the audio signal from one instrument (e.g. HA1) to the other (e.g. HA2) is, however, expensive (in a power consumption sense). Alternatively, the enhanced signals (OV1, OV2) from both hearing instruments (HA1, HA2) are transmitted to the telephone, which then combines the signals from left and right instrument into a single enhanced signal. This solution is however difficult, as full access to the different telephone's (e.g. different brands) signal processing capabilities is not always possible.

Figure 4:
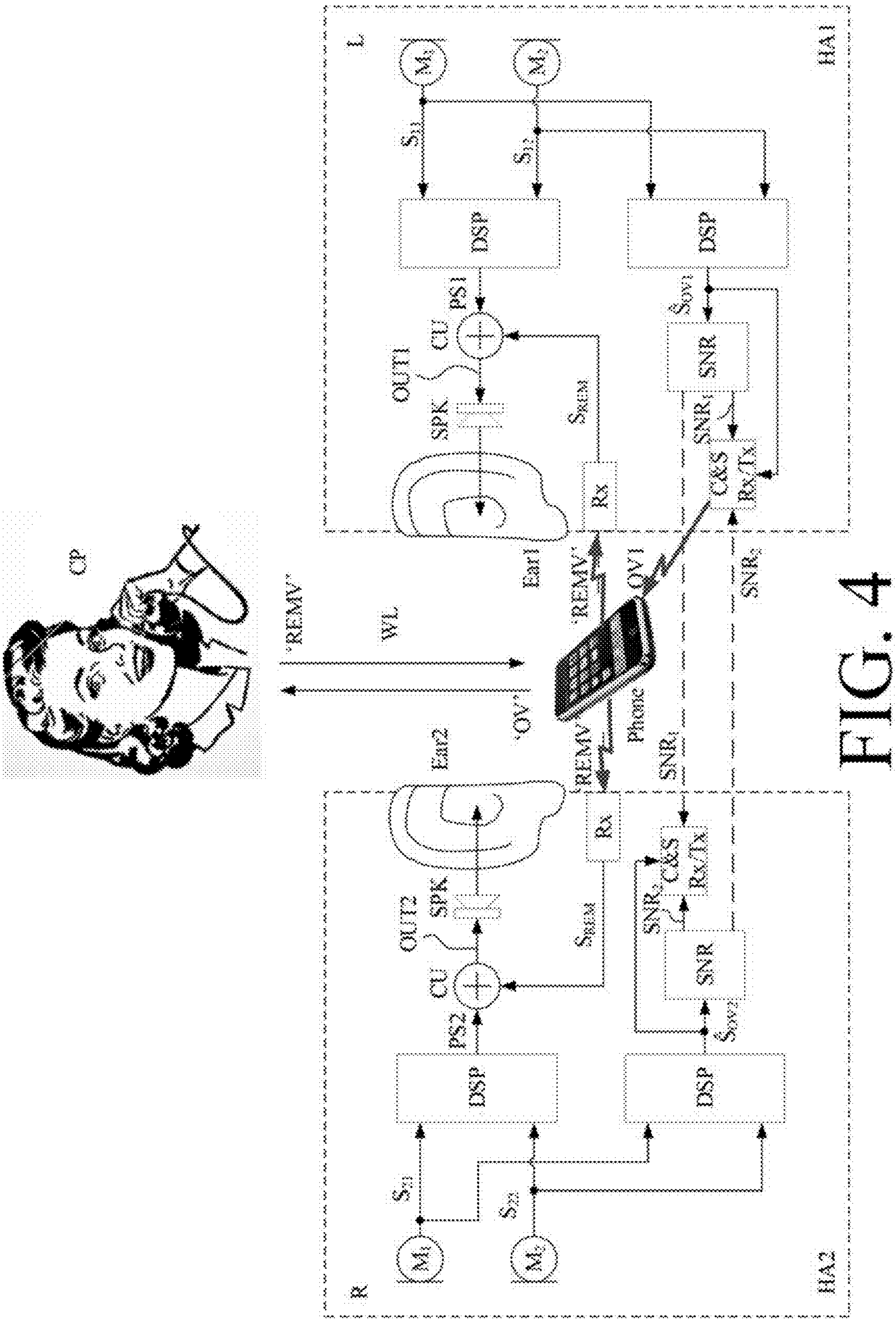
FIG. 4 shows a first embodiment of binaural hearing aid system comprising first and second hearing aids according to the present disclosure in a telephone mode, where a telephone conversation is conducted with a remotely located person.
Figure 5:
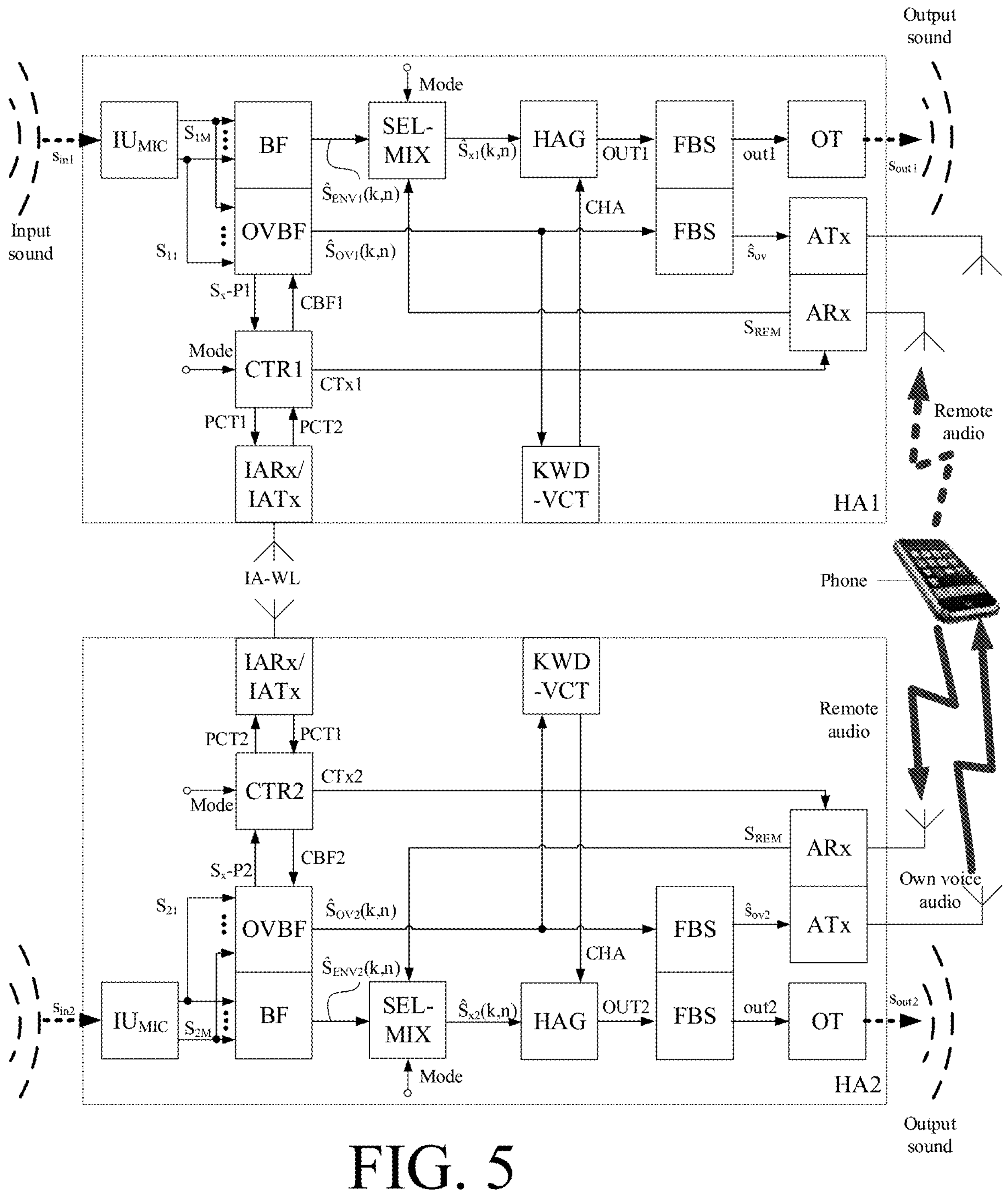
FIG. 5 shows a second embodiment of binaural hearing aid system comprising first and second hearing aids according to the present disclosure in a telephone mode, where a telephone conversation is conducted with a remotely located person.

FIGS. 1, 4 and 5 illustrate exemplary embodiments of solutions to the problem illustrated in FIG. 2. FIG. 1, FIG. 3. FIG. 4 and FIG. 5 show a hearing aid (FIG. 1) and a binaural hearing aid system (FIG. 3, 4, 5) in a telephone mode of operation, where the user is engaged in a telephone conversation with a remote communication partner (CP) via respective telephone sets and, e.g. a public switched telephone network (PSTN). The hearing aid (HA) and the first and second hearing aids (HA1, HA2) of the binaural hearing aid system worn by the user are used as an audio interface to the user's telephone apparatus (Phone), here a portable telephone, e.g. a smartphone. As illustrated in FIG. 1, the electric input signals ($S_1$, $S_2$) are branched off from the forward (audio) path of the hearing aid(s) and processed in a processor (e.g. a digital signal processor, DSP) and an estimate $\hat{S}_{ov}$ of the user's own voice is thereby provided. The user's own voice is (e.g. wirelessly, e.g. via a wireless link (WL), cf. 'OV') transmitted to another device, here to a telephone apparatus (phone), from where it—in a telephone mode of operation—may be transmitted to a telephone apparatus of a remotely connected communication partner (CP).

In other embodiments (modes of operation), the user's own voice ('OV') may be transmitted to a personal digital assistant, e.g. of a smartphone, or similar device, e.g. for providing an audio interface to a search engine, or to a cloud service, e.g. for keyword detection, speech recognition, source separation, or other tasks.

In the telephone mode of operation illustrated in FIG. 1, 4, 5, the hearing aid(s) receive(s) inputs from the user's telephone representing audio from the remote communication partner (CP). The remove voice ('REMV') is received by appropriate transceiver circuitry in the hearing aid(s) and forwarded as signal $S_{REM}$ to combination unit (CU), e.g. a summation unit ('+') located in the forward (audio) path. The forward (audio) path comprises a processor (e.g. a digital signal processor, DSP) for applying one or more processing algorithms to the electric input signals ($S_1$, $S_2$), e.g. beamforming, noise reduction, compression (e.g. for compensating for a user's hearing loss), etc. and providing a processed signal (PS) representing sound from the environment (SI) as received by the input transducers (here microphones) ($M_1$, $M_2$) of the hearing aid. The processed signal (PS) may be mixed with, e.g. added to, the signal $S_{REM}$ comprising the sound received from the remote telephone apparatus (e.g. including the voice of the communication partner (CP)). The resulting (combined) signal (OUT) is fed to an output transducer of the hearing aid(s), here a loudspeaker (SPK) configure to convert the output signal (OUT) to acoustic stimuli (sound, SO) propagated to the user's ear (Ear). Thereby a handsfree audio interface to a telephone apparatus (Phone) of the user is established, cf. e.g. US20150163602A1.

FIG. 4 shows a first embodiment of binaural hearing aid system comprising first and second hearing aids according to the present disclosure in a telephone mode, where a telephone conversation is conducted with a remotely located person. Each of the first and second hearing aids (HA1, HA2) comprises the functional elements of the embodiment of FIG. 1. Based on a locally estimated background noise level (e.g. a background noise level estimate, SNR estimate (as in FIG. 4), speech intelligibility estimate, sound quality estimate or simply a level estimate), the hearing instrument (HA1 or HA2) exhibiting the best quality of the own voice estimate, and from which own voice audio should hence be transmitted via the phone to the far-end listener, may be selected.

At both left and right hearing instruments (HA1, HA2), a local own voice enhancement algorithm is running in a processor (DSP). In principle, no enhancement algorithm is mandatory for the proposed method, however. Furthermore, an SNR estimator (SNR) in each hearing instrument is configured to estimate a local (own voice) signal-to-noise ratio, which may be exchanged between the first and second instruments (HA1, HA2) via an interaural link, e.g. a wireless link (cf. dashed arrows denoted $SNR_1$ (from HA1 to HA2) and $SNR_2$ (from HA2 to HA1), respectively). The SNR values (SNR1 and SNNR2) are compared in respective controllers (C&S RxTx) in each hearing instrument and the own voice signal estimate ($\hat{S}_{ov1}$, $\hat{S}_{ov2}$) from the instrument with the highest signal-to-noise ratio, may be selected for audio transmission to the telephone (Phone). In the example of FIGS. 4 and 5 the best quality own voice signal estimate is the one provided by the first hearing instrument (HA1), and consequently the own voice estimate ($\hat{S}_{ov1}$) of the first hearing instrument (HA1) is transmitted from HA1 to the user's telephone apparatus (Phone), cf. zig-zag arrow (denoted OV1) from unit C&S Rx/Tx of the first hearing instrument (HA1) to the user's telephone apparatus (Phone). The controllers (C&S Rx/Tx) each comprises a comparator for comparing a property (here SNR) of the two electric inputs signals (or as here, the SNR of the beamformed signals in the form of the own voice estimate ($\hat{S}_{ov1}$, $\hat{S}_{ov2}$)) of the local and the opposite hearing aids. The controllers are configured to provide a control signal indicative of which of the first and seconds hearing instrument exhibiting the best own voice estimate according to a criterion related to the property or properties compared (here SNR, the criterion e.g. being largest SNR). The controllers (C&S Rx/Tx) each further comprises appropriate transceiver circuitry (Rx/Tx) allowing the property of the electric inputs signals (or a signal or signals derived therefrom, here an SNR of the beamformed own voice signal) to be exchanged between the two hearing instruments. The signal from the telephone of the remote communication partner (CP), as received by the user's telephone (Phone) (e.g. via a telephone network (PSTN)), is transmitted (via wireless link, e.g. based on Bluetooth or Bluetooth Low Energy (or similar technology)) to the hearing aid(s), e.g. to the hearing instrument (here HA1) that transmits the user's own voice to the Phone, or to both hearing instruments (HA1, HA2), cf 'REMV' from Phone to receiver (Rx) of the respective hearing instrument(s) (HA1, HA2). The remote signal is received in the hearing instrument(s) by respective wireless receivers (Rx) and the corresponding audio signal ($S_{REM}$) is extracted and forwarded to combination unit (CU), and e.g. mixed with the processed environment signal (PS1, PS2) of the forward audio path to output signal (OUT1, OUT2). The output signal (OUT1, OUT2) is presented to the user via the output transducer (SPK) of the hearing aid(s) in question.

The 'far-end selection', i.e. the selection of which of the first and seconds hearing instrument exhibiting the best own voice estimate according to a criterion related to the property or properties compared could be based on (or influenced by) how well each hearing instrument is mounted. This could e.g. be measured by an accelerometer measuring the tilt of the instrument. If the angle of the microphone array direction w.r.t the mouth is small a better own voice pickup is expected (worst case is when the mouth direction is orthogonal to the mouth direction).

As the own voice level is similar at the two hearing instruments (due to the symmetry of the head and ears relative to the mouth), other (simpler) measures than the SNR estimate may be applied for comparison and selection, e.g. noise level estimate (select instrument with lowest noise estimate) or simply a level estimate (select instrument with lowest level estimate, e.g. measured during absence of OV, and/or e.g. measured while the far-end talker is active).

As an alternative to SNR. Further, local speech intelligibility estimates or speech quality estimates may be applied to the selection criterion. In order to make a possible switch of transmitting instrument as inaudible as possible, switching may be performed while the far-end is talking.

FIG. 5 shows a second embodiment of binaural hearing aid system comprising first and second hearing aids according to the present disclosure in a telephone mode, where a telephone conversation is conducted with a remotely located person. The embodiment of a binaural hearing aid system of FIG. 5 is similar to the embodiment of FIG. 4 but comprises more functional elements and is described in more detail. Input sound $s_{in1}$, $s_{in2}$ at the input ($IU_{MIC}$) of the respective first and second hearing aids (HA1, HA2) is picked up by M input transducers, e.g. microphones, and corresponding M electric input signals, $S_{11}, \ldots, S_{1M}$ and $S_{21}, \ldots, S_{2M}$ of the first and second hearing aids are provided to the beamformer filter. The electric input signals of each hearing aid may be provided in a time-frequency representation (k,n) (where k and n are frequency and time indices, respectively) by respective (M) analysis filter banks (cf. e.g. 'Filterbank' in FIG. 6, 7), e.g. included in the input unit ($IU_{MIC}$) The beamformer filter comprises an environment beamformer (BF) and an own voice beamformer (OVBF). The environment beamformer (BF) provides spatially filtered environment signal $\hat{S}_{env}(k,n)$, e.g. an estimate of a target signal in the (far-field) environment of the user. The own voice beamformer (OVBF) provides spatially filtered estimate of the user's own voice $\hat{S}_{ov}(k,n)$.

The first and second hearing aids each comprises a forward audio processing path for processing acoustic signals picked up by the input unit and for presenting (at least in a normal mode of operation) to the user via an output transducer (OT), preferably in an enhanced version, e.g. for better perception (e.g. intelligibility of speech) by the user. In the embodiment of FIG. 5 the forward audio processing path is assumed to be conducted in the frequency domain (k,n). The forward audio processing path comprises environment beamformer (BF) and a selector-mixer (SEL-MLX) connected to the environment beamformer. The selector-mixer is configured to allow a mixing of the environment signal $\hat{S}_{env}(k,n)$ (or a processed version thereof) with another signal, here a signal ($S_{REM}$) received from an external device, e.g. a telephone. The output signal ($\hat{S}_x(k,n)$) from the selector-mixer (SEL-MIX) is a weighted combination of the two input signals ($\hat{S}_{env}(k,n)$, $S_{REM}$) in the respective hearing aids (HD1, HD2). The output signal ($\hat{S}_x(k,n)$) from the selector-mixer (SEL-MIX) may be equal to one of the input signals or to a mixture of the two (e.g. $\hat{S}_x(k,n)=\alpha\ \hat{S}_{env}(k,n)+(1-\alpha)S_{REM}$, $0\leq\alpha\leq1$), e.g. in each of the first and second hearing aids (HA1, HA2)). In a telephone mode, the weighting factor α may e.g. be smaller than 0.5 (e.g. ≤0.8) so that the largest weight is on the remotely received audio signal. In a normal (non-communication) mode, the weighting factor α may e.g. be equal to 1, so that only the environment sound signal ($\hat{S}_{env}(k,n)$) is propagated in the forward audio processing path. The selector-mixer (SEL-MIX) is controlled by a mode control signal (Mode). The forward audio processing path may further comprise a processor (HAG) for applying one or more processing algorithms to an input signal ($\hat{S}_{x1}(k,n)$, $\hat{S}_{x2}(k,n)$) and providing a processed (enhanced) output signal (OUT1, OUT2). The one or more processing algorithms may comprise a compressive amplification algorithm configured to compensate for a hearing impairment of the user (e.g. to apply a frequency and level dependent gain to the input signal to the processor (HAG)). The forward path may further comprise a synthesis filter bank (FBS) configured to convert a signal (OUT1, OUT2) in the frequency domain to a signal in the tune domain (out1, out2). The time domain output signal (out1, out2) is fed to respective output transducers of the first and second hearing aids (HA1, HA2) for presentation as stimuli perceivable as sound to the user of the binaural hearing aid system. The output transducers (OT) may comprise a loudspeaker of an air conduction hearing aid, anchor a vibrator bone conducting hearing aid or a multielectrode array of a cochlear implant type hearing aid. In the embodiment of FIG. 5, the output transducer (OT) of the first and second hearing aids is assumed to provide 'Output sound' $s_{out1}$ and $s_{out2}$ at the first and second ear, respectively, of the user.

The own voice beamformer (OVBF) is configured to provide an estimate ($\hat{S}_{ov1}(k,n)$, $\hat{S}_{ov2}(k,n)$) of the user's own voice in dependence of the electric input signals ($S_{11}, \ldots, S_{1M}$ and $S_{21}, \ldots, S_{2M}$) of the respective hearing aids (HA1-HA2). The estimate of the user's own voice (or a further processed (e.g. further noise reduced) version thereof) is fed to a synthesis filter bank (FBS) for converting the frequency sub-band signals ($\hat{S}_{ov1}(k,n)$, $\hat{S}_{ov2}(k,n)$) to time-domain signals ($\hat{s}_{ov1}(t)$, $\hat{s}_{ov2}(t)$, where t is time) in the respective first and second hearing aids (HA1, HA2). The time domain representation of the own voice estimate is fed to the transmitter part (ATx) of the audio transceiver and transmitted to the external device (cf. 'Own voice audio' from 'HA2' to 'Phone' (cf. solid bold zig-zag arrow) in FIG. 5) in dependence of a comparison control signal (CTx1, CTx2), cf. below.

The first and second hearing aids may each comprise a controller (CTR1, CTR2) configured to evaluate the sound at the input unit ($IU_{MIC}$) and providing a control signal (PCT1, PCT2) indicative of a property (e.g. SNR, or nose level, etc.) of the sound, by evaluating one or more of the electric input signals ($S_{11}, \ldots, S_{1M}$ and $S_{21}, \ldots S_{2M}$) (or a processed (e.g. filtered) version thereof) of the first and second hearing aids, respectively, cf signals $S_x$-P1 and $S_x$-P2 from the own voice beamformer (OVBF) to the controller (CTR1, CTR2) of the first and second hearing aids, respectively. The controller (CTR1, CTR2) may further be configured to control (e.g. enable, disable) the own voice beamformer (OVBF) (cf. signal CBF1, CBF2), e.g. in dependence of the mode of operation, e.g. controlled by a mode control signal (Mode). An own voice beamformer of a particular hearing aid may be disabled when the estimate of the user's own voice is not required (e.g. to be transmitted to the users telephone in a telephone mode or to be forwarded to a voice control interface in a voice control mode, etc.).

The first and second hearing aids may each comprise a transceiver (IARx/IATx) configured to establish a (interaural) communication link (IA-WL) between the first and second hearing aids (HA1, HA2) allowing the exchange of the control signals (PCT1, PCT2) between the first and second hearing aids. The first and second hearing aids may each be transmit said locally provided control signal (PCT1, PCT2) to, and to receive a corresponding remotely provided control signal (PCT3, PCT1) from the opposite hearing aid via the (interaural) communication link (IA-WL). The controller (CTR1, CTR2) of the first and second hearing aids may be configured to compare the locally provided and the remotely provided control signals (PCT1, PCT2) and to provide a comparison control signal (CTx1, CTx2) in dependence thereof.

The first and second hearing aids (HA1, HA2) may each comprise an audio transceiver (ATx, ARx) for establishing an audio link for transmitting an audio signal, e.g. an own voice estimate ($\hat{S}_{ov1}$(k,n), $\hat{S}_{ov2}$(k,n)), or a processed version thereof, to another device, e.g. a telephone (Phone in FIG. 5). The first and second hearing aids (HA1, HA2) are configured to control the transceiver (at least the transmitter part (ATx)) in dependence of the comparison control signal (CTx1, CTx2). The controller (CTR1, CTR2) may be activated or deactivated in dependence of a mode control signal (Mode) indicative of a present mode of operation (e.g. a telephone mode or a normal (non-communication) mode). The controller (CTR1, CTR2) may be configured to provide the mode control signal (Mode) indicative of an intended present mode of operation, e.g. based on one or more detectors or external inputs (e.g. a request from a telephone) or based on an input from a user interface. In the telephone mode of operation, audio from a remote communication partner may be received by the first and/or second hearing aid (HA1, HA2) via the user's telephone (Phone), cf 'Remote audio' from 'Phone' to the receiver (ARx) of the second hearing aid (HA2) (solid bold zig-zag arrow) and optionally to the receiver (ARx) of the first hearing aid (HA1) (dashed bold zigzag arrow)

The first and second hearing aids (HA1, HA2) of the binaural hearing aid system are configured to operate in at least two modes, e.g. a communication mode (e.g. a telephone mode), a non-communication mode (e.g. a normal mode), and/or a voice control mode, e.g. controlled by a mode control signal (Mode). The mode control signal may be provided via a user interface (e.g. a remote control, e.g. implanted via an APP of a smartphone or similar device). The mode control signal may be provided automatically, as a result of one or more detectors or sensors or other control signals. The first and second hearing aids may be configured to receive the mode control signal from a telephone, e.g. indicative of an incoming call. The mode control signal, e.g. an incoming call indicator, may bring the first and second hearing aids in a communication mode, where the selector/mixer is controlled to select an input signal SREM from a remote speaker (or to mix such signal with the environment signal ($\hat{S}_{ENV1}$(k,n), $\hat{S}_{ENV2}$(k,n)) of the first and second hearing aids, respectively.

The first and second hearing aids (HA1, HA2) may each further comprise a keyword detector of a voice control interface (KWD-VCT) to allow a user to influence functionality of the hearing aid (cf. signal CHA) by a limited number of specific spoken commands. The keyword detector may receive the estimate of the user's own voice ($\hat{S}_{ov1}$(k,n), $\hat{S}_{ov2}$(k,n)). The voice control interface may be enabled in a specific voice control mode of operation. The keyword detector/voice control interface (KWD-VCT) provides a control signal (CHA) to the processor (HAG), e.g. to change a hearing aid program, e.g. to change mode of operation (e.g. to enter a telephone mode), to change a volume, etc. Keyword detection in a hearing aid is e.g. discussed in EP3726856A1.

Figure 6:
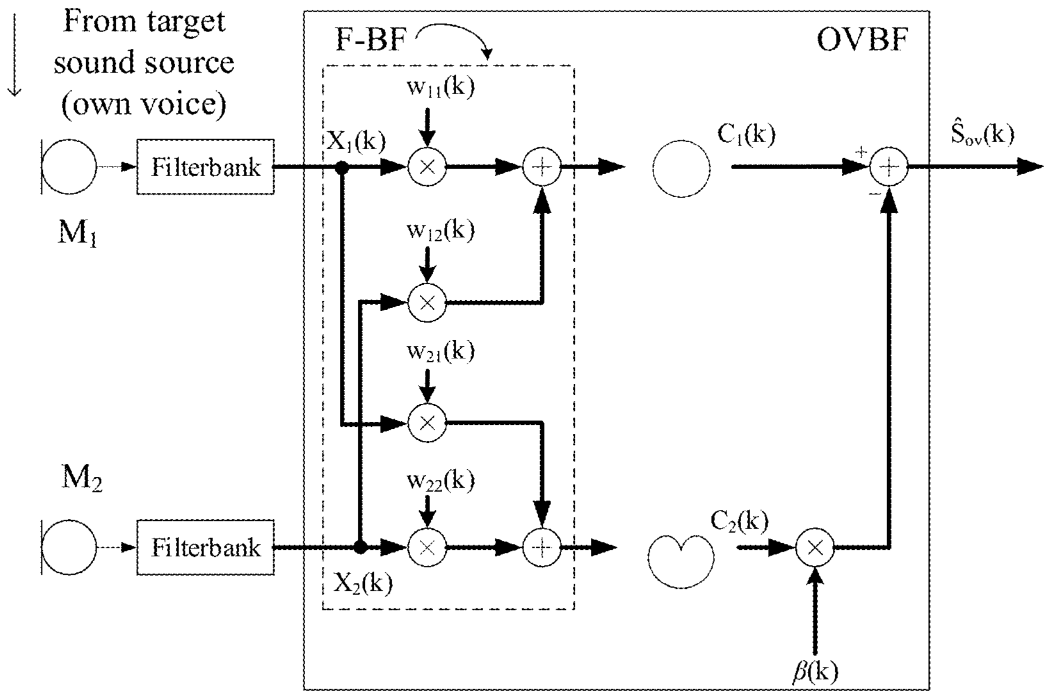
FIG. 6 shows an adaptive (own voice) beamformer configuration, wherein the adaptive beamformer in the k'th frequency sub-band $\hat{S}_{ov}$ (k) is created by subtracting a (e.g. fixed) target cancelling beamformer $C_2(k)$ scaled by the adaptation factor β(k) from an (e.g. fixed) omni-directional beamformer $C_1(k)$.
Figure 7:
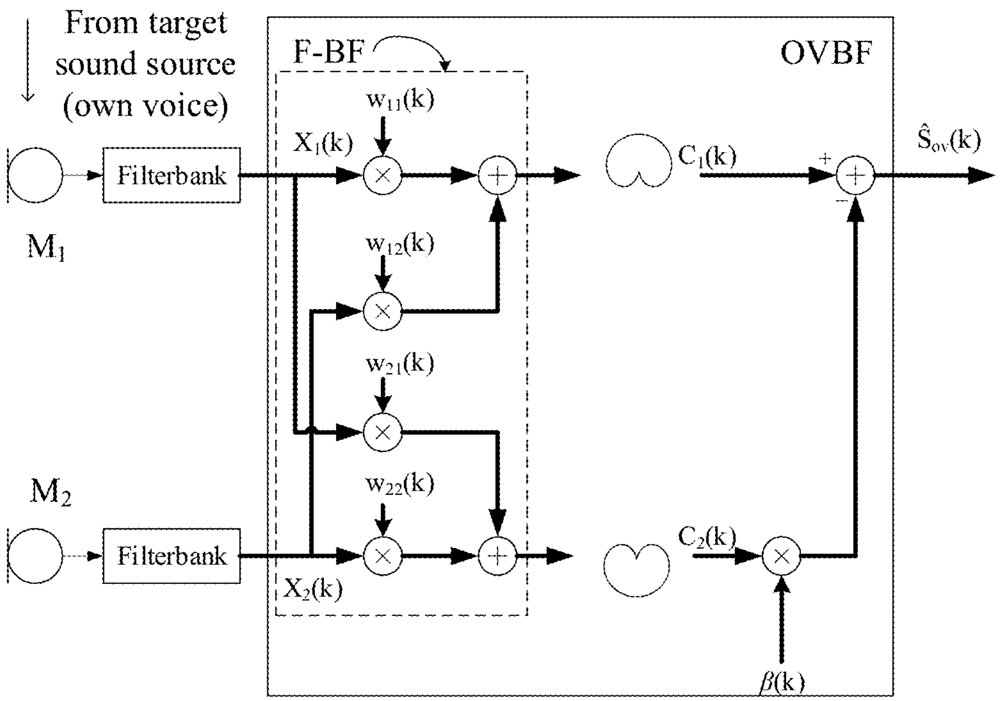
FIG. 7 shows an adaptive (own voice) beamformer configuration similar to the one shown in FIG. 6, where the adaptive beampattern $\hat{S}_{ov}(k)$ is created by subtracting a target cancelling beamformer $C_2(k)$ scaled by the adaptation factor β(k) from another fixed beampattern $C_1(k)$.

FIGS. 6 and 7 illustrate respective embodiments of adaptive beamformer configurations that may be used to implement an own voice beamformer (OVBF) for use in a sound capture device according to the present disclosure as e.g. illustrated in FIG. 5. FIGS. 6 and 7 both show a two-microphone configuration, which is frequently used in state of the art hearing devices, e.g. hearing aids (or other sound capture devices). The beamformers may, however, be based on more than two microphones, e.g. on three or more (e.g. as a linear array or possibly arranged in a non-linear configuration). An adaptive beampattern ($\hat{S}_{ov}$(k)), for a given frequency band k, is obtained by linearly combining two beamformers $C_1$(k) and $C_2$(k). $C_1$(k) and $C_2$(k) (time indices have been skipped for simplicity), each representing different (possibly fixed) linear combinations of first and second electric input signals $X_1$ and $X_2$, from first and second microphones $M_1$ and $M_2$, respectively. The first and second electric input signals $X_1$ and $X_2$ are provided by respective analysis filter banks ('Filterbank'). The frequency domain signals (downstream of the respective analysis filter banks ('Filterbank') are indicated with bold arrows, whereas the time domain nature of the outputs of the first and second microphones ($M_1$, $M_2$) are indicated as thin line arrows. The block 'F-BF' (indicated by a dashed rectangular enclosure) in FIGS. 6 and 7 refer to so-called fixed beamformers defined by complex sets of constants $w_1=(w_{11}, w_{12})$ and $w_2=(w_{21}, w_{22})$ providing beamformed signals $C_1$(k) and $C_2$(k), respectively.

FIG. 6 shows an adaptive beamformer configuration, wherein the adaptive beamformer in the k'th frequency sub-band $\hat{S}_{ov}$(k) is created by subtracting a (e.g. fixed) target cancelling beamformer $C_2$(k) scaled by the adaptation factor β/((k) from an (e.g. fixed) omni-directional beamformer $C_1$(k). The adaptation factor β may e.g. be determined as $$\beta = \frac{\langle C_2^* C_1 \rangle}{\langle |C_2|^2 \rangle}$$

The two beamformers $C_1$ and $C_2$ of FIG. 6 are e.g. orthogonal. This is actually not necessarily the case. The beamformers of FIG. 7 are not orthogonal. When the beamformers $C_1$ and $C_2$ are orthogonal, uncorrelated noise will be attenuated when $\beta=0$.

Whereas the (reference) beampattern $C_1(k)$ in FIG. 6 is an omni-directional beampattern, the (reference) beampattern $C_1(k)$ in FIG. 7 is a beamformer with a null towards the opposite direction of that of $C_2(k)$. Other sets of fixed beampatterns $C_1(k)$ and $C_2(k)$ may as well be used.

FIG. 7 shows an adaptive beamformer configuration similar to the one shown in FIG. 6, where the adaptive beampattern $\hat{S}_{ov}(k)$ is created by subtracting a target cancelling beamformer $C_2(k)$ scaled by the adaptation factor $\beta(k)$ from another fixed beampattern $C_1(k)$. This set of beamformers are not orthogonal. In case that $C_2$ in FIGS. 6 and 7 represents an own voice-cancelling beamformer, $\beta$ will increase, when own voice is present.

The beampatterns could e.g. be the combination of an omni-directional delay-and-sum-beamformer $C_1(k)$ and a delay-and-subtract-beamformer $C_2(k)$ with its null direction pointing towards the target direction (e.g. the mouth of the person wearing the device, i.e. a target-cancelling beamformer) as shown in FIG. 6 or it could be two delay-and-subtract-beamformers as shown in FIG. 7, where one, $C_1(k)$, has maximum gain towards the target direction, and the other beamformer, $C_2(k)$, is a target-cancelling beamformer. Other combinations of beamformers may as well be applied. Preferably, the beamformers should be orthogonal, i.e. $w_1 w_2^H=[w_{11} w_{12}][w_{21} w_{22}]^H=0$. The adaptive beampattern arises by scaling the target cancelling beamformer $C_2(k)$ by a complex-valued, frequency-dependent, e.g. adaptively updated scaling factor $\beta(k)$ and subtracting it from the $C_1(k)$, i.e.

$$Y(k)=C_1(k)-\beta(k)C_2(k)=w_1^H(k)x(k)-\beta(k)w_2^H(k)x(k).$$

Where $w_1^H=[w_{11},w_{12}]$, $w_2^H=[w_{21},w_{22}]$ are complex beamformer weights according to FIG. 6 or FIG. 7 and $x=[x_1,x_2]^T$ is the input signals at the two microphones (after filter bank processing).

In the context of FIGS. 6 and 7, the fixed reference beamformer $C_1=w_1^H(k)x(k)$, and the fixed target-cancelling beamformer $C_2=w_2^H(k)x(k)$, where $w_1^H=[w_{11},w_{12}]$, and $w_2^H=[w_{21},w_{22}]$ are complex beamformer weights, e.g. predetermined and stored in a memory (or occasionally updated during use), and $x=[x_1,x_2]^T$ represent the (current) electric input signals at the two microphones (after filter bank processing).

An Example of Controlling Processing of Beamformers:

A method for selecting beamforming with a limited amount of processing is described in the following.

Figure 8:
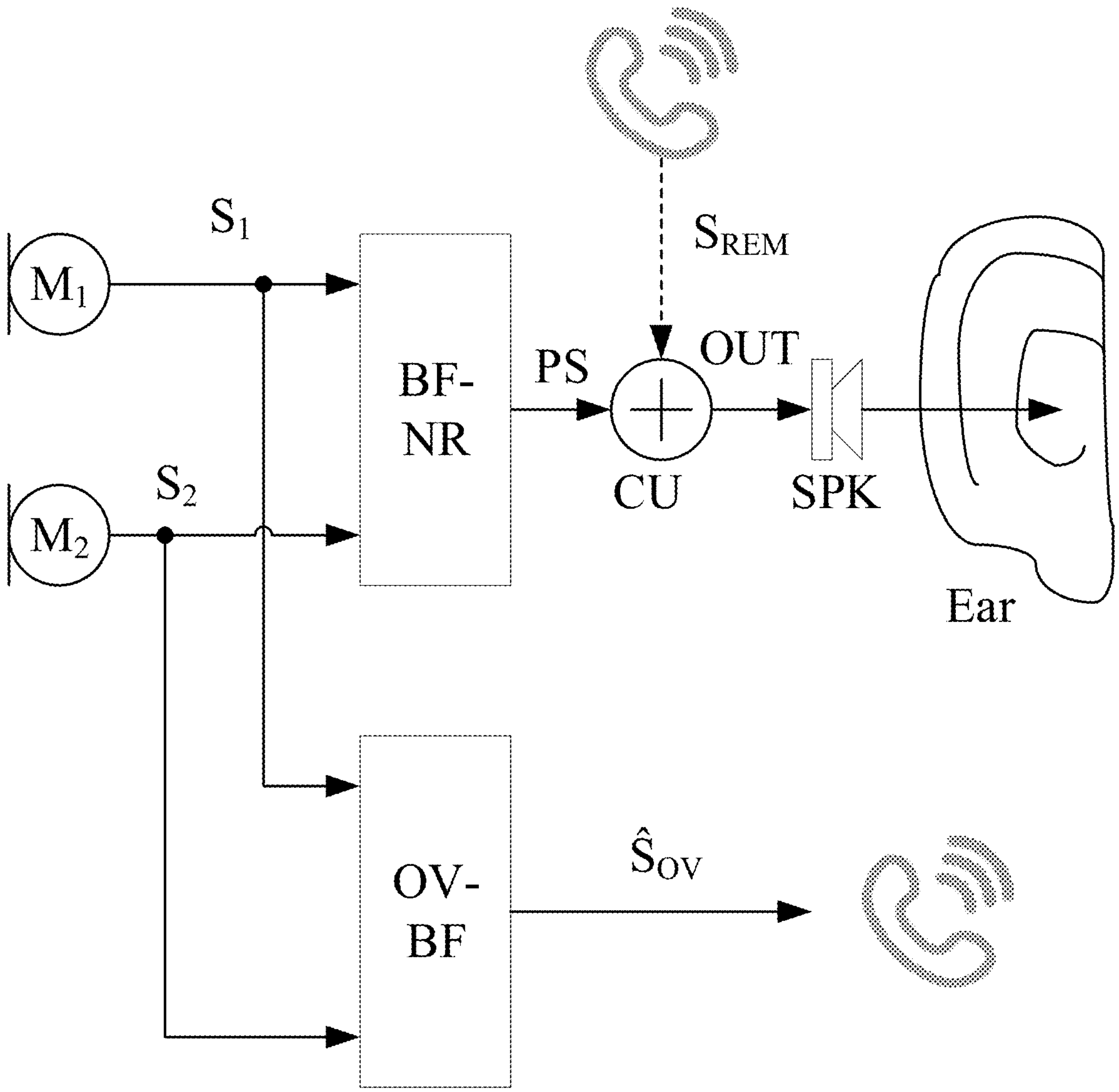
FIG. 8 shows a hearing device in a telephone configuration, FIG. 9A

Consider a hearing device (HD) in FIG. 8, e.g. a hearing aid or a headset. FIG. 8 shows a hearing device in a telephone configuration. The hearing device user is listening to a mixture (OUT) of the surroundings (PS) and the far-end talker ($S_{REM}$). The far-end talker is preferably listening to the hearing device user's own voice ($\hat{S}_{ov}$), where in the background noise has been attenuated.

In other words, the hearing device (HA) is preferably processing two different sound streams:

- one sound stream to be presented to the hearing device user consisting of a mixture (OUT) of the far-end talker ($S_{REM}$) and the possibly noise-reduced surroundings (signal PS);
- the other sound stream presented to the far-end talker mainly consisting of the hearing device wearer's own voice ($\hat{S}_{ov}$), preferably with background noise reduced, e.g. using a beamformer (OVBF).

The embodiment of a hearing device in FIG. 8 is equivalent to the embodiment shown in FIG. 1, which may represent a hearing aid (in a specific communication mode of operation, or a headset in a normal mode of operation). The processors 'DSP' in FIG. 1 are denoted 'BF-NR' and 'OVBF', respectively, in FIG. 8. BF-NR represents an environment beamformer-noise reduction system (e.g. a beamformer filter followed by a post filter). OVBF represents an own voice beamformer-noise reduction system (e.g. a beamformer filter followed by a post filter).

Enhancing a sound by removing noise requires processing power. An adaptive beamformer may e.g. require more processing power than a fixed beamformer. We thus have a trade-off between performance and processing power.

In a typical hearing device, the speech enhancement system may consist of a directional microphone unit followed by a noise reduction system. The directional system may consist of an adaptive beamformer, which adaptively attenuates the noise while keeping the target sound unaltered. An example of such a beamformer is an MVDR beamformer. Compared to a fixed beamformer, an adaptive beamformer is able to adapt to the noise (and sometimes even to the direction of the target signal). For the special case where the hearing device microphones are used as input signals for a telephone conversation, the hearing device may be able to process the microphone signals into two output signals, each having a different purpose. One output contains the sound to be presented to the person who is wearing the hearing device(s) (local signal); the other output contains the sound which should be presented to the far-end listener (far-end signal). In most situations (e.g. in a hearing aid), the local signal is the most important sound, and the main processing power should be applied to the local signal in order to obtain the best possible balance between the sound of interest and the background noise. However, in a telephone situation, the situation is different. If the voice of the hearing device wearer is not intelligible, a telephone conversation is not possible. Thus, the most important signals are a) the far-end signal to be presented to the hearing instrument user and b) the voice of the hearing instrument wearer which is presented to the far-end listener. During a telephone conversation, the local signal is of less importance. It is typically presented to the hearing device wearer with a reduced level, where it does not reduce the intelligibility of the far-end talker—just to make the person wearing the hearing device aware of the surroundings.

In order to make most use of the processing power, it is therefore proposed to prioritize the processing power (e.g. adaptive noise reduction, post processing, processing based on neural networks, etc.) depending on the mode of operation of the hearing device. If the hearing device (e.g. a hearing aid) is in a normal mode, the majority of the processing is aimed at enhancement of the surroundings while less (or no) processing power is applied in order to pick up the own voice signal (e.g. to be used as preprocessing for keyword detection). Contrary if the hearing device is in telephone mode, it is proposed to change the processing such that the majority of the processing power available for noise reduction is applied to the own voice signal and less processing is applied to the local sound presented to the hearing instrument wearer. The proposed processing scheme is illustrated in FIG. 9.

Figure 9A:
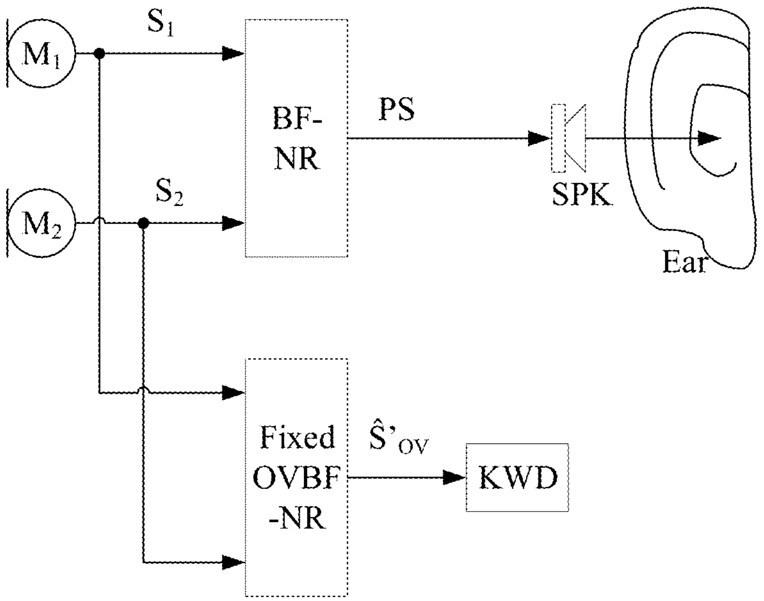
FIG. 9B illustrates a scheme for managing processing in a hearing device depending on its mode of operation, FIG. 9A illustrating a normal mode of operation, FIG. 9B illustrating a telephone mode of operation.
Figure 9B:
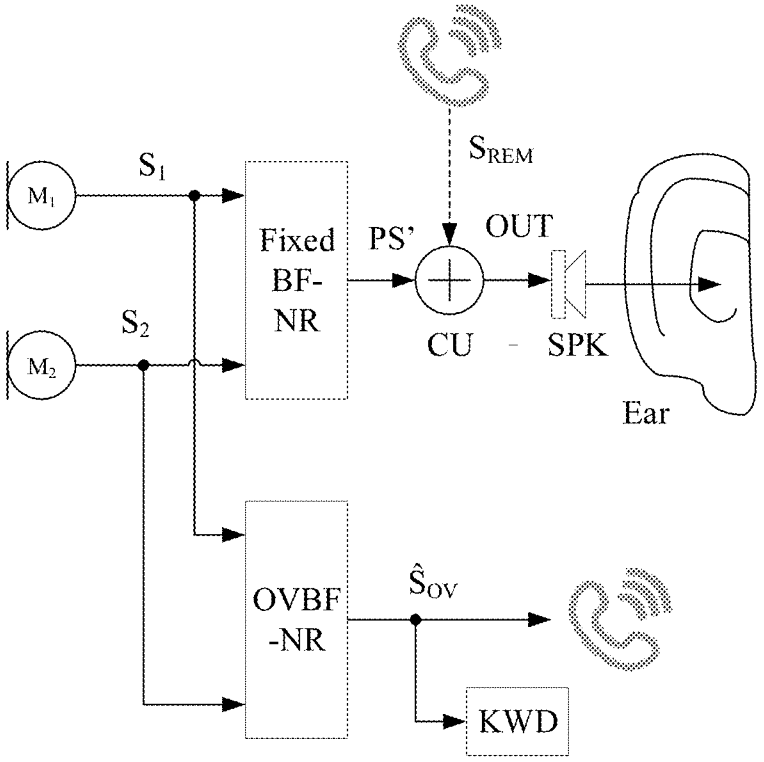

FIG. 9A and FIG. 9B illustrates a scheme for managing processing in a hearing device depending on its mode of operation.

FIG. 9A and FIG. 9B embody the following general concept in the form of a hearing aid configured to be worn by a user at or in an ear of the user. The hearing aid comprises at least two input transducers configured to pick up a sound at said at least two input transducers and to convert the sound to respective at least two electric input signals representative of said sound. The hearing aid further comprises first and second filters for filtering the at least two electric input signals and providing respective first and second filtered signals. The hearing aid further comprises an output transducer for converting the first filtered signal, or a signal derived therefrom, to stimuli perceivable by the user as sound. The second filter is configured to provide that the second filtered signal comprises a current estimate of the user's own voice. The hearing aid further comprises a transceiver for establishing an audio link to an external communication device (e.g. a telephone). The hearing aid may further comprise a controller configured to allow the hearing aid to operate in at least two modes, a communication mode wherein the audio link to the external communication device is established, and at least one non-communication mode. The first and second filters aid may be configured to operate in a more power consuming and a less power consuming mode in dependence of the controller. The controller may be configured to a) set said first filter in the less power consuming mode, and b) set said second filter in said more power consuming mode, when the hearing aid is in said communication mode. The controller may additionally or alternatively be configured to c) set the first filter in the more power consuming mode, and d) set the second filter in the less power consuming mode, when the hearing aid is in the non-communication mode.

FIG. 9A illustrates a normal mode of operation (e.g. of a hearing aid), where the adaptive beamformer is applied to the local processing (cf blockBF-NR implementing an adaptive beamformer providing a noise reduced version (PS) of a target signal in the environment if the hearing device (cf e.g. FIG. 6, 7 where the target signal is a signal in the environment, e.g. in the look direction of the user (microphone direction of the hearing device)). The own voice beamformer (block Fixed OVBF-NR), on the other hand, relies on a fixed own voice enhancing beamformer (cf. signal $\hat{S}'_{ov}$), because the estimate of the user's own voice is used for secondary processing such as pre-processing for own voice keyword detection (cf unit KWD). In the case of a fixed (e.g. own voice) beamformer, the weights are estimated based on a fixed noise distribution, e.g. in order to maximize the directivity or maximize the ratio between OV impinging within a certain range of near-field angles and omni-directional far-field noise.

FIG. 9B illustrates a telephone mode of operation (e.g. of a hearing aid or a normal mode of a headset), where the adaptive beamformer is applied in order to enhance the user's own voice (cf. block OVBF-NR providing an enhanced own voice estimate, cf. signal $\hat{S}_{ov}$). A fixed beamformer (or alternatively just the signal from a single microphone, cf. block Fixed BF-NR), on the other hand, is used to process the local signal (cf resulting processed signal PS'), which is presented to the user together with the signal $S_{REM}$ from the remote end, as the main signal of interest to the hearing instrument user is the far-end talker.

In other modes too, where the main signal of interest is not received by the hearing instrument microphones, change of processing focus may be applied. Such situations could e.g. be TV streaming, Bluetooth streaming, FM or telecoil streaming, see e.g. EP3637800A1.

Figure 10A:
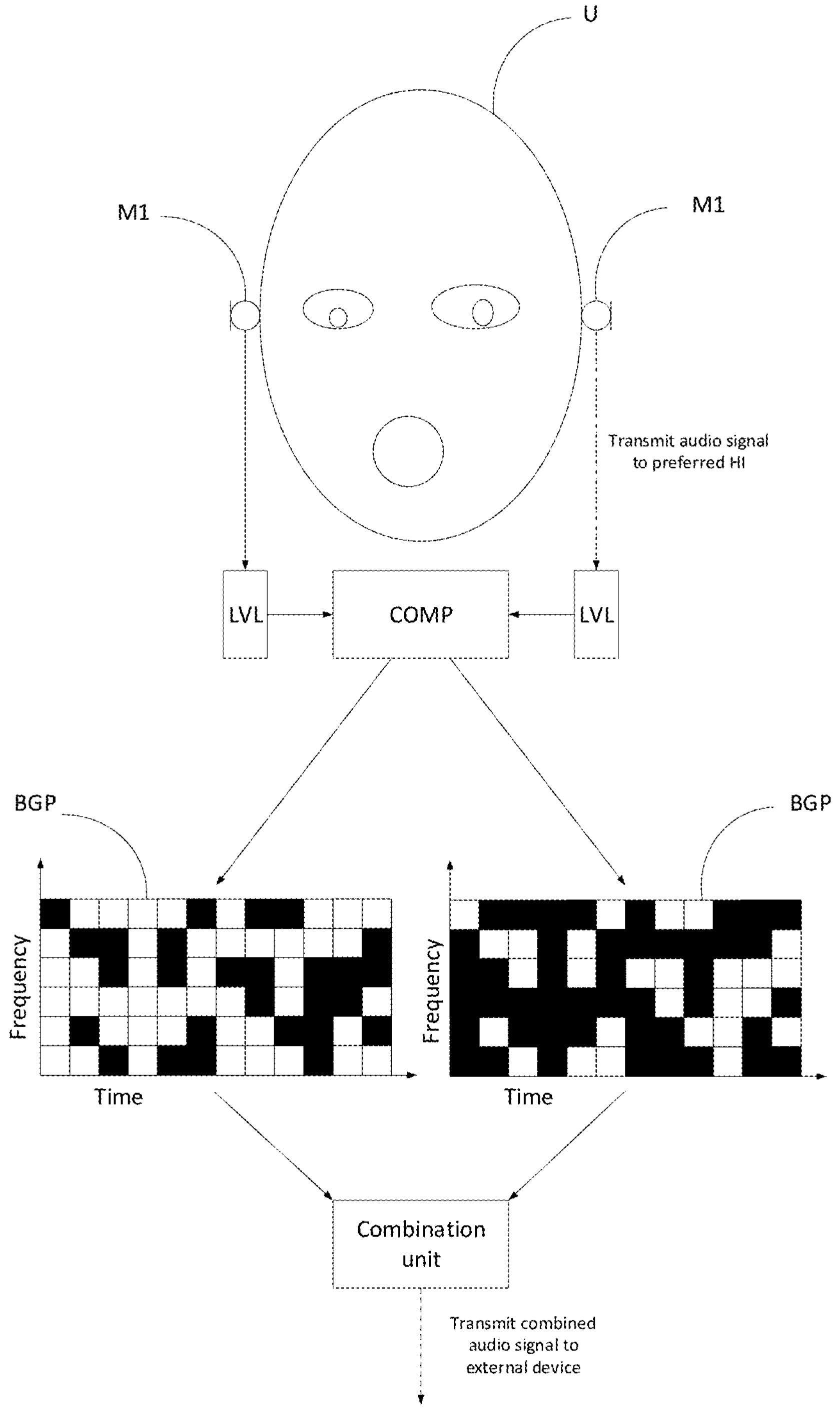
FIG. 10A shows a binaural hearing aid system comprising first and second hearing aids, where the binaural audio signals are combined.

FIG. 10A shows a binaural hearing aid system comprising first and second hearing aids, where the binaural audio signals are combined.

In FIG. 10A, a binaural hearing aid system worn by a hearing aid user (U) is shown. The binaural hearing aid system may comprise a first and a second hearing aid each comprising a first hearing aid microphone (M1). The first and second hearing aids of the binaural hearing aid system may each comprise a level estimator (LVL), and one or both of the first and second hearing aids may comprise a comparison unit (COMP). The level estimator may either measure the level of the mixture or the level of a noise estimate (e.g. the level of a target cancelling beamformer), but as the level of the target is assumed to be similar on the two ears, the level measured directly on the mixture may be preferred.

A level may typically be measured in dB (or in the logarithmic domain). Alternatively, the level may be calculated directly from the magnitude or magnitude-squared signal (the actual level does not matter, the levels just need to be compared in order find the minimum). The level may be based on a single sample (e.g. every millisecond) or be measured as an average across several samples, e.g. by filtering across the time axis by a 1st order IIR low pass filter with a time constant. In an embodiment, the time constant is 0 millisecond, in another embodiment, the time constant is less than 5 milliseconds.

The exemplified drawing shows a case with a single microphone on each ear, but more local microphones may be used (e.g. with two or more microphones in the first and/or second hearing aids as illustrated in the FIGS. above). The selection of local microphones may be done in a similar way as exemplified in the drawing, where the microphone (or linear combination of microphones) with the lowest level is selected.

In FIG. 10A it is assumed that the audio signal (e.g. the electric input signal) may be transmitted to the hearing aid which is selected to transmit the own voice enhanced signal to an external device, such as a mobile phone. The selection criterion for selecting which hearing aid should transmit the audio signal to the external device could e.g. be based on link quality between each of the hearing aids and the external device (which may be different (and independent) from the binaural link quality).

Based on noise level measurements/estimates (in time-frequency segments) of the audio signals of the two hearing aids, time-frequency segments may be selected such that the audio signal with the smallest noise level is chosen. Thereby, a binary gain pattern (BGP) relating to each of the first and second hearing aid may be created. It may be assumed that the level of the own voice signal will be similar in the first and the second hearing aids due to the similar and symmetric distance of the mouth compared to the microphones (M1).

A combination unit ('Combination unit') of the binaural hearing aid system may provide a combined audio signal based on the time-frequency segments in the binary gain pattern (BGP), where the audio signal with the smallest noise level in each time-frequency segment is selected. The resulting signal may be synthesized back to a time-domain signal and be transmitted to the external device.

Thereby, the binaural hearing aid system may combine binaural audio signals in order to reduce e.g. wind noise.

Figure 10B:
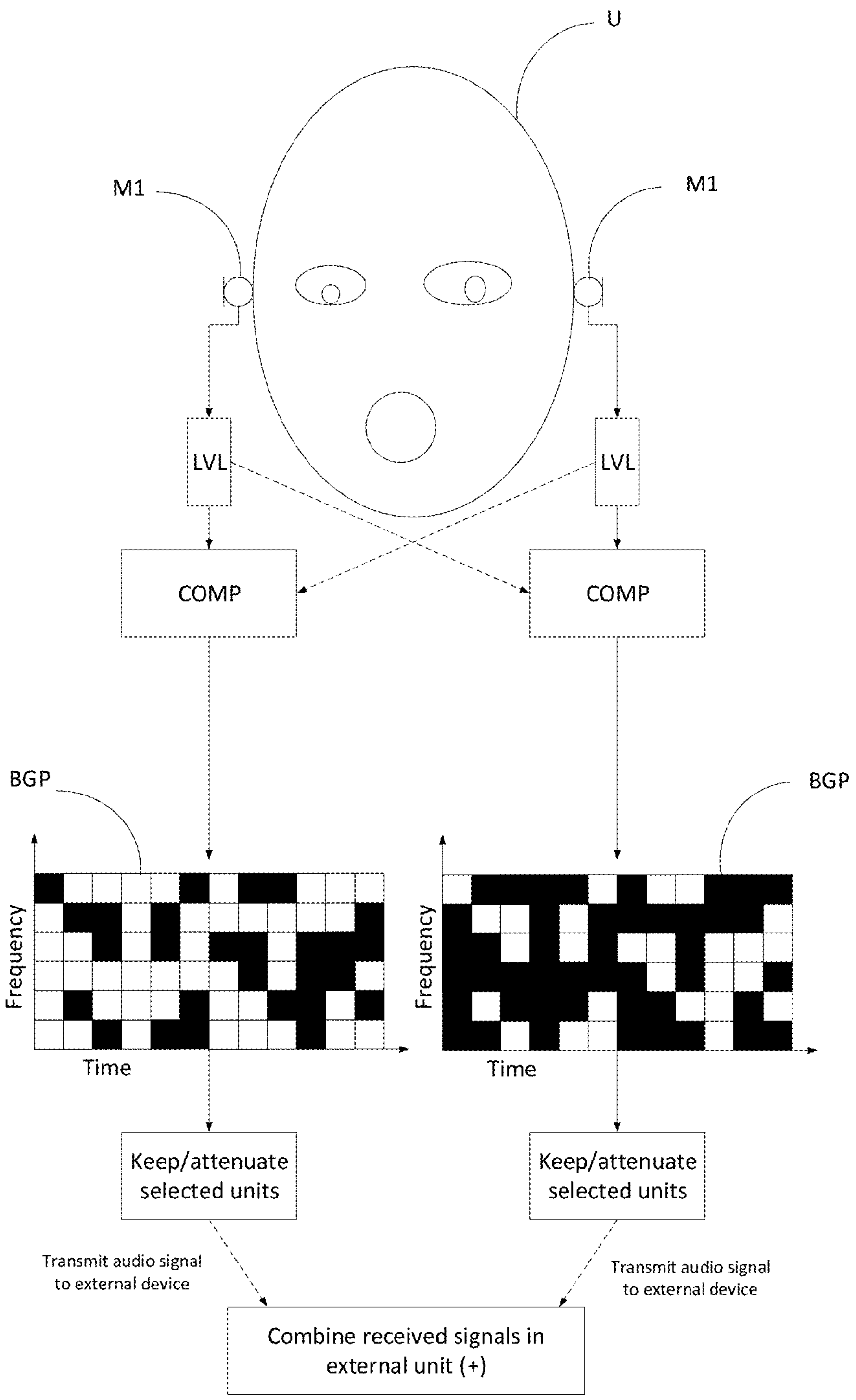
FIG. 10B shows a further binaural hearing aid system comprising first and second hearing aids, where the binaural audio signals are combined.

FIG. 10B shows a further binaural hearing aid system comprising first and second hearing aids, where the binaural audio signals are combined. For similar features as in FIG. 10A, similar reference numbers are used.

In FIG. 10B, only the noise levels (as estimated by the level estimator (LVL)) are exchanged between the first and second hearing aids. Only exchanging noise levels binaurally may require less binaural transmission bandwidth compared to transmitting a full audio signal between the two hearing devices.

The noise levels may be compared (by comparison units (COMP) in each of the first and second hearing aids) in order to select/create two binary gain patterns (BGP), which may be configured to attenuate the time-frequency units which have the highest local noise level after comparison.

The binary gain patterns (BGP) of the respective first and second hearing aids may be applied to the local audio signals, so that the respective audio signals may be attenuated or kept/enhanced depending on the binary gain patterns (BGP). The synthesized audio signals from both hearing aids may then be transmitted to an external device (such as a mobile phone), where the audio signals from the first and second hearing aids may be combined, e.g. by a simple addition.

Alternatively, the local microphone signals may be transmitted directly to the external device in which similar processing steps may take place. However, an external device may not be capable of doing the proposed processing steps, and it may thus be an advantage to apply the majority of the processing in the hearing aids before the audio signals are transmitted to the external device.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise, it will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art, to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more," Unless specifically stated otherwise, the term "some" refers to one or more.

REFERENCES

US20150163602A1 (Oticon) 11 Jun. 2015
EP3637800A1 (Oticon) 15 Apr. 2020
EP3726856A1 (Oticon) 21 Oct. 2020

The invention claimed is:

1. A hearing aid configured to be worn by a user at or in an ear of the user, the hearing aid comprising at least two input transducers configured to pick up a sound at said at least two input transducers and to convert the sound to respective at least two electric input signals representative of said sound, a first filter for filtering said at least two electric input signals and providing a first filtered signal, an output transducer for converting said first filtered signal, or a signal derived therefrom, to stimuli perceivable by the user as sound, a second filter for filtering said at least two electric input signals and providing a second filtered signal comprising a current estimate of the user's own voice, a transceiver for establishing an audio link to an external communication device, a controller configured to allow the hearing aid to operate in at least two modes, a communication mode wherein said audio link to said external communication device is established, and at least one non-communication mode, wherein each of the first and second filters are configured to operate in a more power consuming and a less power consuming mode in dependence of said controller, and wherein said controller, when said hearing aid is in said communication mode, is configured to set said first filter in said less power consuming mode, and set said second filter in said more power consuming mode.

2. A hearing aid according to claim 1, wherein said controller, when said hearing aid is in the non-communication mode, is configured to set said first filter in the more power consuming mode, and set said second filter in the less power consuming mode.

3. A hearing aid according to claim 1, wherein said controller is configured to provide a mode control signal indicative of an intended present mode of operation.

4. A hearing aid according to claim 1, wherein, when the first filter is in said more power consuming mode, said first filter consumes more than twice the power than when in said less power consuming mode.

5. A hearing aid according to claim 1, wherein, when the second filter is in said more power consuming mode, said second filter consumes more than twice the power than when in said less power consuming mode.

6. A hearing aid according to claim 1, wherein said first and second filters each comprise a beamformer filter for providing a spatially filtered signal based on the at least two electric input signals.

7. A hearing aid according to claim 6, wherein said first and second filters each comprise a beamformer filter for providing a spatially filtered signal based on a linear combination of said at least two electric input signals in dependence of generally complex beamformer weights.

8. A hearing aid according to claim 7, wherein, when the first or second filter is in the less power consuming mode beamformer weights of the beamformer filter are pre-determined.

9. A hearing aid according to claim 6, wherein said beamformer filter is adaptive in that noise is adaptively attenuated.

10. A hearing aid according to claim 6, wherein said beamformer filter is fixed in that said beamformer weights are pre-determined.

11. A hearing aid according to claim 6, wherein, when said first or second filter is in the more power consuming mode, beamformer weights of the beamformer filter are adaptively determined.

12. A hearing aid according to claim 1, wherein said first and second filters each comprise a post filter configured to filter the spatially filtered beamformed signal and provide a further noise reduced signal.

13. A hearing aid according to claim 12, wherein, when the first or second filter is in the more power consuming mode, said post filter is activated.

14. A hearing aid according to claim 12, wherein, when the first or second filter is in the less power consuming mode, said post filter is de-activated.

15. A hearing aid according to claim 1, wherein said external communication device is a telephone.

16. A binaural hearing aid system comprising first and second hearing aids according to claim 1 configured to be worn by a user at or in respective first and second ears of the user, wherein each of said first and second hearing aids comprises a transceiver configured to establish a communication link between the first and second hearing aids allowing the exchange of control signals between the first and second hearing aids.

17. A method of operating a hearing aid configured to be worn at or in an ear of a user, the method comprising converting a sound picked up by at least two input transducers to respective at least two electric input signals representative of said sound, filtering said at least two electric input signals and providing a first filtered signal by a first filter, converting said first filtered signal, or a signal derived therefrom, to stimuli perceivable by the user as sound, filtering said at least two electric input signals and providing a second filtered signal comprising a current estimate of the user's own voice by a second filter, establishing an audio link to an external communication device, allowing the hearing aid to operate in at least two modes, a communication mode wherein said audio link to said external communication device is established, and at least one non-communication mode, by a controller, wherein each of the first and second filters are configured to operate in a more power consuming and a less power consuming mode in dependence of said controller, and wherein, when said hearing aid is in said communication mode, setting said first filter in said less power consuming mode, and setting said second filter in said more power consuming mode.

* * * * *